US007676660B2

(12) United States Patent
Kissell

(10) Patent No.: US 7,676,660 B2
(45) Date of Patent: *Mar. 9, 2010

(54) SYSTEM, METHOD, AND COMPUTER PROGRAM PRODUCT FOR CONDITIONALLY SUSPENDING ISSUING INSTRUCTIONS OF A THREAD

(75) Inventor: Kevin D. Kissell, Le Bar sur Loup (FR)

(73) Assignee: MIPS Technologies, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/949,603

(22) Filed: Dec. 3, 2007

(65) Prior Publication Data

US 2008/0140998 A1     Jun. 12, 2008

Related U.S. Application Data

(63) Continuation of application No. 10/929,342, filed on Aug. 27, 2004, now Pat. No. 7,321,965, which is a continuation-in-part of application No. 10/684,350, filed on Oct. 10, 2003, now Pat. No. 7,376,954, and a continuation-in-part of application No. 10/684,348, filed on Oct. 10, 2003.

(60) Provisional application No. 60/499,180, filed on Aug. 28, 2003, provisional application No. 60/502,358, filed on Sep. 12, 2003, provisional application No. 60/502,359, filed on Sep. 12, 2003.

(51) Int. Cl.
*G06F 7/38*     (2006.01)
*G06F 9/00*     (2006.01)
*G06F 9/44*     (2006.01)
*G06F 15/00*     (2006.01)

(52) U.S. Cl. .................................................... 712/220

(58) Field of Classification Search .................. 712/220
See application file for complete search history.

(56) References Cited

U.S. PATENT DOCUMENTS 4,817,051 A     3/1989   Chang (Continued)

FOREIGN PATENT DOCUMENTS

EP     0725334 A1     8/1996

(Continued)

OTHER PUBLICATIONS

Ungerer et al. A Survey of Processors with Explicit Multithreading. ACM Computing Surveys, vol. 35, No. 1. Mar. 2003. pp. 29-63.

(Continued)

*Primary Examiner*—Eddie P Chan
*Assistant Examiner*—Corey S Faherty
(74) *Attorney, Agent, or Firm*—Sterne, Kessler, Goldstein & Fox P.L.L.C.

(57) ABSTRACT

A microprocessor core includes a plurality of inputs that indicate whether a corresponding plurality of independently occurring events has occurred. The inputs are non-memory address inputs. The core also includes a yield instruction in its instruction set architecture, comprising a user-visible output operand and an explicit input operand. The input operand specifies one or more of the independently occurring events. The yield instruction instructs the microprocessor core to suspend issuing for execution instructions of a program thread until at least one of the independently occurring events specified by the input operand has occurred. The program thread contains the yield instruction. The yield instruction further instructs the microprocessor core to return a value in the output operand indicating which of the independently occurring events occurred to cause the microprocessor core to resume issuing the instructions of the program thread.

25 Claims, 40 Drawing Sheets

U.S. PATENT DOCUMENTS

| | | | |
|---|---|---|---|
| 4,860,190 A | 8/1989 | Kaneda et al. | |
| 5,159,686 A | 10/1992 | Chastain et al. | |
| 5,428,754 A * | 6/1995 | Baldwin | 712/220 |
| 5,499,349 A | 3/1996 | Nikhil et al. | |
| 5,511,192 A | 4/1996 | Shirakihara | |
| 5,515,538 A | 5/1996 | Kleiman | |
| 5,659,786 A | 8/1997 | George et al. | |
| 5,758,142 A | 5/1998 | McFarling et al. | |
| 5,799,188 A | 8/1998 | Manikundalam et al. | |
| 5,812,811 A | 9/1998 | Dubey et al. | |
| 5,867,704 A | 2/1999 | Tanaka et al. | |
| 5,892,934 A | 4/1999 | Yard | |
| 5,933,627 A | 8/1999 | Parady | |
| 5,944,816 A | 8/1999 | Dutton et al. | |
| 5,949,994 A | 9/1999 | Dupree et al. | |
| 5,961,584 A | 10/1999 | Wolf | |
| 6,061,710 A | 5/2000 | Eickemeyer et al. | |
| 6,088,787 A | 7/2000 | Predko | |
| 6,128,720 A | 10/2000 | Pechanek et al. | |
| 6,175,916 B1 | 1/2001 | Ginsberg et al. | |
| 6,189,093 B1 | 2/2001 | Ekner et al. | |
| 6,205,543 B1 | 3/2001 | Tremblay et al. | |
| 6,223,228 B1 | 4/2001 | Ryan et al. | |
| 6,286,027 B1 | 9/2001 | Dwyer, III et al. | |
| 6,330,656 B1 | 12/2001 | Bealkowski et al. | |
| 6,330,661 B1 | 12/2001 | Torii | |
| 6,401,155 B1 | 6/2002 | Saville et al. | |
| 6,591,379 B1 | 7/2003 | LeVine et al. | |
| 6,643,759 B2 | 11/2003 | Andersson et al. | |
| 6,668,308 B2 | 12/2003 | Barroso et al. | |
| 6,671,791 B1 | 12/2003 | McGrath | |
| 6,675,192 B2 | 1/2004 | Emer et al. | |
| 6,687,812 B1 * | 2/2004 | Shimada | 712/230 |
| 6,697,935 B1 | 2/2004 | Borkenhagen et al. | |
| 6,738,796 B1 | 5/2004 | Mobini | |
| 6,779,065 B2 | 8/2004 | Murty et al. | |
| 6,877,083 B2 | 4/2005 | Arimilli et al. | |
| 6,889,319 B1 | 5/2005 | Rodgers et al. | |
| 6,920,634 B1 | 7/2005 | Tudor | |
| 6,922,745 B2 | 7/2005 | Kumar et al. | |
| 6,971,103 B2 | 11/2005 | Hokenek et al. | |
| 6,986,140 B2 | 1/2006 | Brenner et al. | |
| 6,993,598 B2 | 1/2006 | Pafumi et al. | |
| 7,020,879 B1 | 3/2006 | Nemirovsky et al. | |
| 7,065,094 B2 | 6/2006 | Petersen et al. | |
| 7,069,421 B1 | 6/2006 | Yates, Jr. et al. | |
| 7,073,042 B2 | 7/2006 | Uhlig et al. | |
| 7,093,106 B2 | 8/2006 | Ambekar et al. | |
| 7,127,561 B2 | 10/2006 | Hill et al. | |
| 7,134,124 B2 | 11/2006 | Ohsawa et al. | |
| 7,152,170 B2 | 12/2006 | Park | |
| 7,181,600 B1 | 2/2007 | Uhler | |
| 7,185,183 B1 | 2/2007 | Uhler | |
| 7,185,185 B2 | 2/2007 | Joy et al. | |
| 7,203,823 B2 | 4/2007 | Albuz et al. | |
| 7,216,338 B2 * | 5/2007 | Barnett et al. | 717/126 |
| 7,321,965 B2 * | 1/2008 | Kissell | 712/229 |
| 7,376,954 B2 | 5/2008 | Kissell | |
| 7,386,636 B2 * | 6/2008 | Day et al. | 710/5 |
| 7,424,599 B2 | 9/2008 | Kissell | |
| 7,428,732 B2 | 9/2008 | Sandri et al. | |
| 2002/0083173 A1 | 6/2002 | Musoll et al. | |
| 2002/0083278 A1 | 6/2002 | Noyes | |
| 2002/0091915 A1 | 7/2002 | Parady | |
| 2002/0103847 A1 | 8/2002 | Potash | |
| 2002/0147760 A1 | 10/2002 | Torii | |
| 2002/0174318 A1 | 11/2002 | Stuttard et al. | |
| 2003/0014471 A1 | 1/2003 | Ohsawa et al. | |
| 2003/0074545 A1 | 4/2003 | Uhler | |
| 2003/0079094 A1 | 4/2003 | Rajwar et al. | |
| 2003/0093652 A1 | 5/2003 | Song | |
| 2003/0105796 A1 | 6/2003 | Sandri et al. | |
| 2003/0115245 A1 | 6/2003 | Fujisawa | |
| 2003/0126416 A1 | 7/2003 | Marr et al. | |
| 2003/0225816 A1 | 12/2003 | Morrow et al. | |
| 2004/0015684 A1 | 1/2004 | Peterson | |
| 2004/0139306 A1 | 7/2004 | Albuz et al. | |
| 2005/0050305 A1 | 3/2005 | Kissell | |
| 2005/0050395 A1 | 3/2005 | Kissell | |
| 2005/0120194 A1 | 6/2005 | Kissell | |
| 2005/0125629 A1 | 6/2005 | Kissell | |
| 2005/0125795 A1 | 6/2005 | Kissell | |
| 2005/0240936 A1 | 10/2005 | Jones et al. | |
| 2005/0251613 A1 | 11/2005 | Kissell | |
| 2005/0251639 A1 | 11/2005 | Vishin et al. | |
| 2006/0161421 A1 | 7/2006 | Kissell | |
| 2006/0161921 A1 | 7/2006 | Kissell | |
| 2006/0190945 A1 | 8/2006 | Kissell | |
| 2006/0190946 A1 | 8/2006 | Kissell | |
| 2006/0195683 A1 | 8/2006 | Kissell | |
| 2006/0206686 A1 | 9/2006 | Banerjee et al. | |
| 2007/0043935 A2 | 2/2007 | Kissell | |
| 2007/0044105 A2 | 2/2007 | Kissell | |
| 2007/0044106 A2 | 2/2007 | Kissell | |
| 2007/0106887 A1 | 5/2007 | Kissell | |
| 2007/0106988 A1 | 5/2007 | Kissell | |
| 2007/0106989 A1 | 5/2007 | Kissell | |
| 2007/0106990 A1 | 5/2007 | Kissell | |
| 2007/0186028 A2 | 8/2007 | Kissell | |

FOREIGN PATENT DOCUMENTS

| | | | |
|---|---|---|---|
| EP | 0917057 A2 | 5/1999 | |
| EP | 1089173 A2 | 4/2001 | |
| JP | 8-249195 A | 9/1996 | |
| JP | 2007-504536 | 3/2007 | |
| WO | WO0153935 A1 | 7/2001 | |
| WO | WO 03/019360 A2 | 3/2003 | |
| WO | WO 2005/022385 A1 | 3/2005 | |

OTHER PUBLICATIONS

Fotland, David. A Multithreaded Wireless Network Processor with Software I/O. Embedded Processor Forum. Jun. 18, 2003. In-State MDR;www.MDRonline.com.

Alverson et al., "Tera Hardware-Software Cooperation," Tera Computer Corporation—Proceedings of the IEEE/ACM SC97 Conference—Nov. 15-21, 1997 San Jose, CA.

Carter et al., "Performance and Programming Experience on the Tera MTA,"Tera Computer Corporation—SIAM Conference on Parallel Processing—Mar. 1999.

Marr et al. Hyper-Threading Technology. Intel Technology Journal, Feb. 14, 2002, vol. 6, No. 1, Intel Corporation, USA.

Sunsoft. Multithreaded Programming Guide. 1995. Sunsoft, A Sun Microsystems, Inc. Business. Mountainview, CA.

Engelschall, R.S., "pth GNU Portable Threads," Pth Manual, Online! Feb. 17, 2003, pp. 1-31, XP002315713.

Ishihara et al., "A Comparison of Concurrent Programming and Cooperative Multithreading," Euro-Par 2000 Parallel Processing. 6th International Euro-Par Conference. Proceedings (Lecture Notes in Computer Science vol. 1900) Springer-Verlag Berlin, Germany, Sep. 1, 2000, pp. 729-738, XP002315714, ISBN: 3-540-67956-1.

Frees, W., "Teilzeitarbeit IM Prozessor," Electronik, Franzis Verlag GMBH. Munche, DE, vol. 45, No. 9, Apr. 30, 1996, pp. 100-106, XP000595386, ISSN: 0013-5658 (English-language version of the search report or action which indicates the degree of relevance found by the foreign office is appended.).

Scheidhauer, Ralf, "Design, Implementierung und Evaluierung einer virtuellen Maschine fur Oz," Online!, Dec. 1998, Dissertation, Saarbrucken, (English-language version of the search report or action which indicates the degree of relevance found by the foreign office is appended.).

Mehl et al., "An Abstract Machine for Oz," Research Report RR-95-08, Online!, Jun. 1995, pp. 1-23, Kaiserslautern Saarbrucken, ISSN 0946-008.

Ungerer et al., "Utilising Parallel Resources By Speculation," Parallel and Distributed Processing, 1999. PDP '99. Proceedings of the Seventh Euromicro Workshop on Funchal, Portugal Feb. 3-5, 1999, Los Alamitos, CA, USA, IEEE Computing Society, Feb. 3, 1999, pp. 339-343.

Tsai et al: "The Superthreaded Architecture: Thread Pipelining with Run-Time Data Dependence Checking and Control Speculation," Parallel Architectures and Compiliation Techniques, 1996, Proceedings of the 1996 Conference in Boston, MA, USA, Oct. 20-23, 1996, Los Alamitos, CA, USA, IEEE Comput. Soc., Oct. 20, 1996, pp. 35-46.

Popov, Konstantin: "A Parallel Abstract Machine for the Thread-Based Concurrent Language Oz," Workshop on Parallism and Implementation of Technology for Constraint Logic Programming Languages, Sep. 1997, pp. 1-25.

Ubicom, Inc. A Next Generation Packet Processor for Wireless Networking. Apr. 15, 2003. Ubicom, Inc. Mountain View, CA, USA.

Bolychevsky et al. "Dynamic Scheduling in RISC Architectures." IEEE Proceedings Computers and Digital Techniques, vol. 143, No. 5. Sep. 24, 1996. pp. 309-317.

Kissell, Kevin D. "Microprocessor Forum (MPF) Conference Program Presentation: Architectural Extensions to the MIPS Architecture for High-Performance Embedded Systems." Oct. 15, 2003.

(webpage) Cray MTA-2 Historical Technical Papers, http://www.cray.com/products/programs/mta_2/resources.html. (Mar. 12, 2005), (formerly http://www.cray.com/products/systems/mta/psdocs.html (Jul. 2, 2004)).

Zaslavsky, Leonid et al. "A Scalable Approach for Solving Irregular Sparse Linear Systems on the Tera MTA Multithreaded Parallel Shared-Memory." Ninth SIAM Conference on Parallel Processing for Scientific Computing, San Antonio, TX. Mar. 1999.

Smith, Burton. "From Here to Petaflops." Keynote Address, Petaflops-systems Operations Working Review, (POWR), Bodega Bay, California, Jun. 1998.

Briggs, Preston. "Tuning the BLAS for the Tera." Workshop on Multithreaded Execution, Architecture and Compilation. (MTEAC 98), Jan. 1998.

Alverson, Gail et al., "Scheduling on the Tera MTA." IPPS '95 Workshop on Job Scheduling Strategies for Parallel Processing, Santa Barbara, CA, Apr. 1995, and in D.G. Feitelson and L. Rudolph, editors, Job Scheduling Strategies for Parallel Processing, Lecture Notes in Computer Science vol. 949, pp. 19-44, Springer-Verlag 1995.

Smith, Burton. "Folklore and Reality in High Performance Computing Slide Presentation." 1995.

Smith, Burton. "The Quest for General-Purpose Parallel Computing." 1994.

Alverson, Gail et al., "Exploiting Heterogeneous Parallelism on a Multithreaded Multiprocessor." 6th ACM International Conference on Supercomputing, Washington DC, Jul. 1992.

Callahan, David. "Recognizing and Parallelizing Bounded Recurrences." Fourth Workshop on Languages and Compilers for Parallel Computing. pp. 169-184. Aug. 1991.

Callahan, David et al. "Register Allocation via Hierarchical Graph Coloring." ACM SIGPLAN '91 Conference on Programming Language Design and Implementation, Jun. 1991.

Alverson, Robert. "Integer Division Using Reciprocals." 10th IEEE Symposium on Computer Arithmetic, Jun. 1991.

Callahan, David et al. "Improving Register Allocation for Subscripted Variables." ACM SIGPLAN Conference on Programming Language Design and Implementation, Jun. 1990.

Alverson, Robert et al. "The Tera Computer System." ACM International Conference on Supercomputing, pp. 1-6, Jun. 1990.

Smith, Burton. "The End of Architecture." Keynote Address, 17th Annual Symposium on Computer Architecture, Seattle, Washington, May 1990.

Alverson, Gail et al. "A Future-Based Parallel Language for a General Purpose Highly Parallel Computer." Languages and Compilers for Parallel Computing. pp. 95-113, MIT Press, Cambridge, Massachusetts, 1990.

"MIT Alewife Project: Home Page." retrieved from URL: http://catfish.csail.mit.edu/alewife/ on Jul. 2, 2004.

Arvind and R.A. Innaucci, "Two Fundamental Issues in Multiprocessing." In Proc. of DFVLF-Conf. 1987 on Par.Proc.in Science and Eng., Bonn-Bad Godesberg, W. Germany, Jun. 1987.

Patterson et al. "Computer Organization & Design: The Hardware/Software Interface." 1998. Morgan Kaufmann Publishers, Inc. Second Edition. pp. 592-593.

Silberschatz et al. "Operating Systems Concepts." 1994. Addison-Wesley Publishing Company. Fourth Edition. pp. 267-269, 271-272, 275.

Heuring, Vincent P. and Jordan, Harry F. "Computer Systems and Architecture." Reading, Mass.: Addison Wesley Longman, Inc., © 1997. pp. 35-37.

Sunsoft. Multithreaded Programming Guide. 1994. Sunsoft, A Sun Microsystems, Inc. Business. Mountainview, CA. pp. 6, 12-13, 22-34 and 87.

Hennessy, John L. et al. "Computer Architecture A Quantitative Approach." Second Edition. San Francisco, CA: Morgan Kaufmann Publishers, Inc. 1996. pp. 70-73 and 87-89.

Zilles, Craig B. et al. "The Use of Multithreading for Exception Handling." *micro*, p. 219. 32nd Annual International Symposium on Microarchitecture.

Dorai, Gautham K. et al. "Transparent Threads: Resource Sharing in SMT Processors for High Single-Thread Performance." Proceedings of the International Conference on Parallel Architectures and Compilation Techniques 2002.

MIPS32™ Architecture For Programmers vol. II The MIPS32™ Instruction Set. Revision 2.00. pp. 231 & 311. Document No. MD00086. Jun. 9, 2003. MIPS Technologies, Inc.

Agarwal, A. et al., "April: A Processor Architecture for Multiprocessing," *ACM SIGARCH Computer Architecture News*, vol. 18, Issue 3a, pp. 104-114, Jun. 1990.

Culler, D.E. et al., *Two Fundamental Limits on Dataflow Multiprocessing*, Report No. UCB/CSD 92/716, pp. 1-14, 1993.

English Translation of Notice of Rejection for Japanese Patent Application No. 2006-524900, dated Nov. 28, 2008, 4 pages.

English Translation of Notice of Rejection for Japanese Patent Application No. 2006-52429, dated Nov. 28, 2008, 4 pages.

English Translation of Notice of Rejection for Japanese Patent Application No. 2006-524961, dated Nov. 28, 2008, 3 pages.

English Abstract of Japanese Patent Publication No. 2007-504536, published September Mar. 1, 2007, 1 page.

English Abstract of Japanese Patent Publication No. 8-259195, published Sep. 27, 1996, 1 page.

*Exception Handler*, from Free Online Dictionary of Computing, 1 page, Oct. 31, 1994.

Kane, G. and Heinrich, J., *MIPS RISC Architecture*, Prentice Hall, Upper Saddle River, New Jersey, 1992. (entire book submitted).

Kissell, K.D., "MIPS MT: A Multithreaded RISC Architecture for Embedded Real-Time Processing," *High Performance Embedded Architectures and Compilers*, Spring, vol. 4917/2008, pp. 9-21, 2008.

Kwak, H. et al., "Effects of Multithreading on Cache Performance," *IEEE Transaction on Computers*, IEEE, vol. 48, Issue 2, pp. 176-184, Feb. 1999.

Lee, B. et al., "Simulation Study of Multithreaded Virtual Processor," *IASTED International Conference on Parallel and Distributed Systems (Euro-PDS)*, pp. 1-6, Jul. 3, 1998.

*MIPS32® Architecture for Programmers, vol. III: The MIPS32® Privileged Resource Architecture*, Revision 2.50, Jul. 1, 2005, MIPS Technologies, Inc., 137 pages.

*MIPS32® Architecture for Programmers, vol. IV-f: The MIPS® MT Application-Specific Extension to the MIPS32® Architecture*, Revision 1.00, Sep. 28, 2005, MIPS Technologies, Inc., 83 pages.

Sweetman, D., *See MIPS Run*, Morgan Kaufmann Publishers, San Francisco, CA (2002). (entire book submitted).

Teller et al., "Locating Multiprocessor TLBs at Memory," *Proc. of the Twenty-Seventh Annual Hawaii International Conference on System Sciences, IEEE*, pp. 554-563, 1994.

Thiébaut, D. et al., "Improving Disk Cache Hit-Ratios Through Cache Partitioning," *IEEE Transactions on Computers*, vol. 41, No. 6, pp. 665-676, 1992.

Office Communication, dated Apr. 9, 2007, for U.S. Appl. No. 10/928,746, filed Aug. 27, 2004, 28 pages.

Office Communication, dated Oct. 23, 2007, for U.S. Appl. No. 10/928,746, filed Aug. 27, 2004, 27 pages.

Office Communication, dated Apr. 21, 2008, for U.S. Appl. No. 10/928,746, filed Aug. 27, 2004, 29 pages.

Office Communication, dated Jan. 22, 2009, for U.S. Appl. No. 10/928,746, filed Aug. 27, 2004, 31 pages.

Office Communication, dated Jun. 21, 2007, for U.S. Appl. No. 10/929,097, filed Aug. 27, 2004, 18 pages.

Office Communication, dated Feb. 17, 2009, for U.S. Appl. No. 10/929,102, filed Aug. 27, 2004, 32 pages.

Office Communication, dated Apr. 6, 2007, for U.S. Appl. No. 10/954,988, filed Sep. 30, 2004, 8 pages.

Office Communication, dated Jan. 9, 2008, for U.S. Appl. No. 10/954,988, filed Sep. 30, 2004, 9 pages.

Office Communication, dated Jul. 29, 2008, for U.S. Appl. No. 10/954,988, filed Sep. 30, 2004, 8 pages.

Office Communication, dated Mar. 5, 2009, for U.S. Appl. No. 10/954,988, filed Sep. 30, 2004, 5 pages.

Office Communication, dated Dec. 19, 2006, for U.S. Appl. No. 10/955,231, filed Sep. 30, 2004, 19 pages.

Office Communication, dated Aug. 9, 2007, for U.S. Appl. No. 10/955,231, filed Sep. 30, 2004, 23 pages.

Office Communication, dated Mar. 6, 2007, for U.S. Appl. No. 11/330,914, filed Jan. 11, 2006, 21 pages.

Office Communication, dated Jul. 20, 2007, for U.S. Appl. No. 11/330,914, filed Jan. 11, 2006, 27 pages.

Office Communication, dated May 15, 2008, for U.S. Appl. No. 11/615,960, filed Dec. 23, 2006, 17 pages.

Office Communication, dated Dec. 8, 2008, for U.S. Appl. No. 11/615,960, filed Dec. 23, 2006, 15 pages.

Office Communication, dated Apr. 10, 2009, for U.S. Appl. No. 11/615,960, filed Dec. 23, 2006, 16 pages.

Office Communication, dated Oct. 17, 2008, for U.S. Appl. No. 11/615,963, filed Dec. 23, 2006, 16 pages.

Office Communication, dated Apr. 3, 2009, for U.S. Appl. No. 11/615,963, filed Dec. 23, 2006, 15 pages.

Office Communication, dated Oct. 15, 2008, for U.S. Appl. No. 11/615,964, filed Dec. 23, 2006, 18 pages.

Office Communication, dated Apr. 13, 2009, for U.S. Appl. No. 11/615,964, filed Dec. 23, 2006, 16 pages.

Office Communication, dated Oct. 16, 2008, for U.S. Appl. No. 11/615,965, filed Dec. 23, 2006, 17 pages.

Office Communication, dated Apr. 9, 2009, for U.S. Appl. No. 11/615,965, filed Dec. 23, 2006, 16 pages.

\* cited by examiner

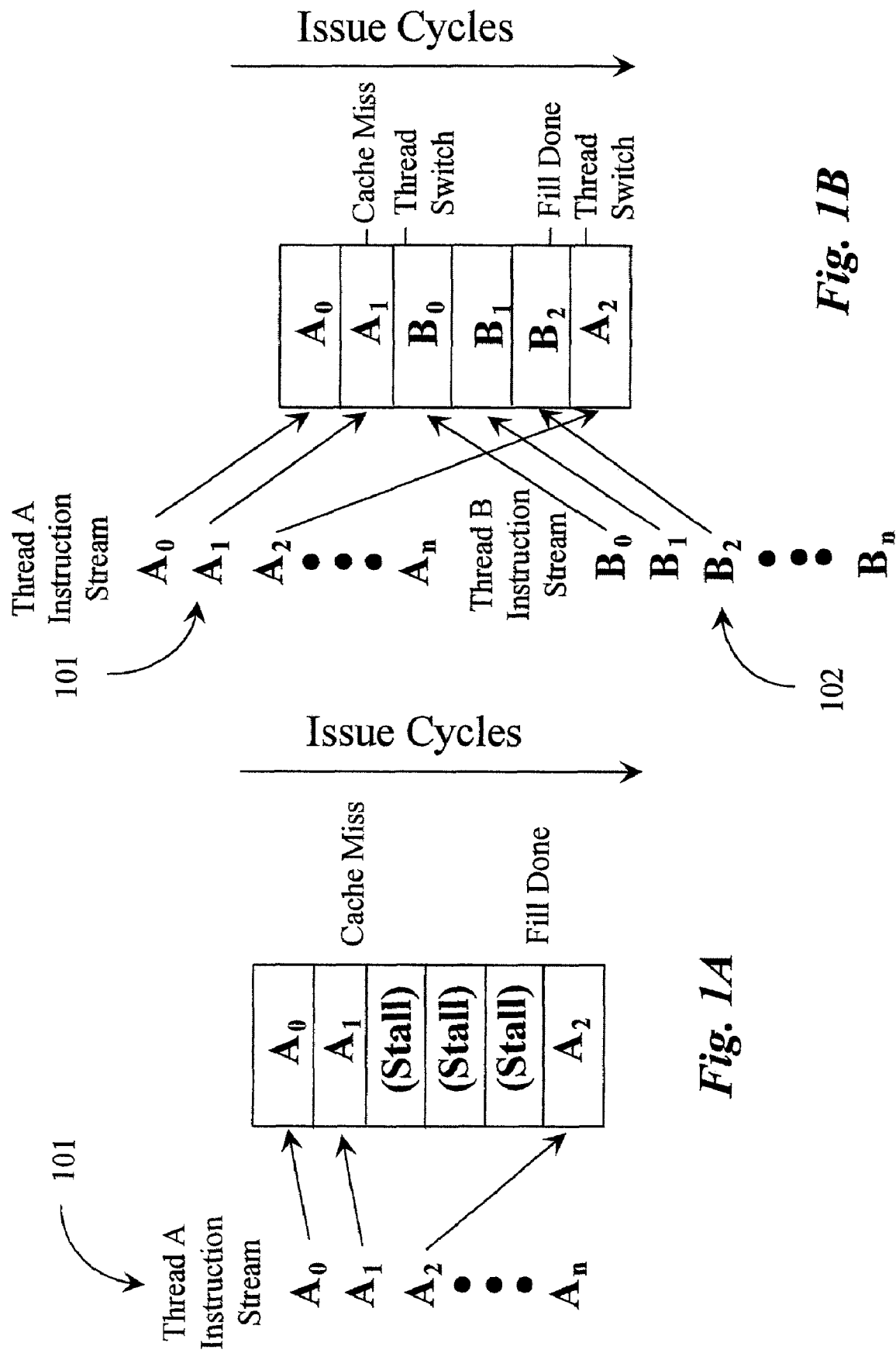

| u value | sel value | Register Selected |
|---|---|---|
| 0 | n | Coprocessor 0 Register number rd, sel = sel |
| 1 | 0 | GPR[rd] |
| 1 | 1 | If rd = 0, Lo Register<br>If rd = 1, Hi Register<br>If rd = 2, ACX Register<br>Other Values of rd, Reserved, Unpredictable |
| 1 | 2 | FPR[rd] |
| 1 | 3 | FPCR[rd] |
| 1 | 4 | Cop2 Data[rd] |
| 1 | 5 | Cop2 Control [rd] |
| 1 | >5 | Reserved, Unpredictable |

| Register Name | New or Modified | CP0 Register Number | Register Select Number | Description |
|---|---|---|---|---|
| ThreadContext | New | 4 | 1 | Per Thread Read/Write Storage for OS use |
| ThreadConfig | New | 6 | 1 | Per-VPE register containing relatively non-volatile thread configuration data |
| ThreadSchedule | New | 6 | 2 | Optional per-thread register to assign issue bandwidth within VPE |
| VPESchedule | New | 6 | 3 | Optional per-VPE register to assign issue bandwidth within a processor |
| ThreadControl | New | 7 | 1 | Per-VPE register containing relatively volatile thread configuration data |
| ThreadStatus | New | 12 | 4 | Per-thread status information, includes copies of thread-specific bits of Status and EntryHi registers |
| Config4 | New | 16 | 4 | Per-processor configuration information on thread and VPE-related resources |
| Status | Modified | 12 | 0 | Additions to CU3-CU1 semantics |
| Cause | Modified | 13 | 0 | New cause code |
| EntryLo | Modified | 2,3 | 0 | Previously reserved cache attribute assigned |
| Config3 | Modified | 16 | 3 | Fields added to describe thread-related resource config. |
| EBase | Modified | 15 | 1 | Previously reserved bit used to inhibit VPE with corresponding CPUNum value |
| SRSCtl | Modified | 12 | 2 | Previously hard-wired field now Soft and a function the ThreadConfig register |

| Fields | | Description | Read/Write | Reset State | Fork State |
|---|---|---|---|---|---|
| Name | Bits | | | | |
| TCU (TCU3..TCU0) | 31..28 | Controls access and binding of threads to coprocessors 3, 2, 1, and 0 respectively. Status CU3..CU0 are identical to ThreadStatus TCU3..TCU0 of the thread refrencing status. The modification of either must bevisible in both. | R/W | 0 | 0 |
| TU | 15 | Thread underflow indication. Set by hardware in conjunction with a Thread Exception being raised in the case of a YIELD instruction that would deallocate the last allocated thread on a VPE. Cleared by any other Thread Exception. | R/W | 0 | 0 |
| H | 14 | Thread halted. When set, the associated thread has been halted and cannot be allocated, activated or scheduled. | R/W | 0 | 0 |
| A | 13 | Thread activated. Set automatically when a FORK instruction allocates the thread context, and cleared automatically when a YIELD $0 instruction deallocated it. | R/W | #1 | 1 |
| TKSU | 12..11 | Defined as per the Status register KSU field. This is the per-thread Kernel/Supervisor/User state. Status.KSU is identical to ThreadStatus. TKSU of the thread referencing status. The modification of either must be visible in both. | R/W | #2 | #3 |
| IXMT | 10 | Interrupt Exempt. If set, thread will not take asynchronous exceptions such as interrupts. | R/W | 0 | 0 |
| TASID | 7:0 | Defined as per the EntryHi register ASID field. This is the per thread ASID value. EntryHi.ASID is identical to ThreadStatus TASID of the thread referencing EntryHi. The modification of either must be visible in both. | R/W | #2 | #3 |
| 0 | 31:16 10:8 | Must be written as 0. Return 0 on read. | 0 | 0 | 0 |

1 - 1 for default/reset thread, 0 for all others
2 - undefined
3 - copied from forking thread

*Fig. 19*

| Fields | | Description | Read/Write | Reset State |
|---|---|---|---|---|
| Name | Bits | | | |
| ForkTarget | 31..27 | GPR number to be used as destination of rt register value on a FORK instruction. | R or R/W | Preset or undefined |
| WiredThread | 7:0 | Index of the lowest numbered thread available for dynamic allocation | R/W | Undefined |
| 0 | 26..8 | Must be written as 0; return 0 on read. | 0 | 0 |

| Fields | | Description | Read/ Write | Reset State |
|---|---|---|---|---|
| Name | Bits | | | |
| M | 31 | This bit is reserved to indicate that a Config5 register is present | R | Preset |
| 0 | 30 | Reserved. Reads as 0. Must be written as o. | R | Preset |
| C1M | 29 | Allocatable CP1 coprocessors are media-extension capabl. | R | Preset |
| C1F | 28 | Allocatable CP1 coprocessors are floating-point capable. | R | Preset |
| ITCP | 27 | If set, ITC locations per page is configuarable. Otherwise Config3.NITC PLocs is fixed. | R | Preset |
| PITCL | 26:19 | Log2 of total processor compliment of ITC storage locations | R | Preset |
| PTLBE | 18:13 | Log2 of total procesor compliment of TLB entry pairs | R | Preset |
| PCOP2 | 12:10 | Log2 of total processor compliment of integrated and allocatable Coprocessor 2's | R | Preset |
| PCOP1 | 9:7 | Log2 of total processor compliment of integrated and allocatable FP/MDMX Coprocessors. | R | Preset |
| PThreads | 6:3 | Log2 of total processor compliment of Thread contexts | R | Preset |
| PVPE | 2:0 | Log2 of total processor compliment of VPE contexts | | |

*Fig. 26*

| Exception Code Value | | Mnemonic | Description |
|---|---|---|---|
| Decimal | Hexadecimal | | |
| 25 | 16#19 | Thread | Thread Allocation or De-allocation Error |

| Fields | | Description | Read/Write | Reset State |
|---|---|---|---|---|
| Name | Bits | | | |
| NITC_PLocs | 30:28 | Number of ITC Synchronization Locations per page of ITC Storage, encoded as Log2 of the number of locations per page.<br><br>2#000 = 1<br>2#001 = 2<br>2#010 = 4<br>2#011 = 8<br>2#100 = 16<br>2#101 = 32<br>2#110 = 64<br>2#111 = 127 | R | Preset |
| NITC_Pages | 27:16 | Number of ITC Pages Available to VPE | R | Preset |
| NThreads | 15:8 | Number of thread contexts available minus 1. If 0, no multithreading capability is implemented. | R | Preset |
| VPC | 3 | Indicates that processor is in a VPE Configuration State. Settable by software only if the MVP bit is set. | R/RW | 0 |
| MVP | 2 | Indicates that the processor has multiple VPE contexts that may be configured. If MVP is set, the adjacent VPC bit may be written by software to enable VPE configuration. MVP may be cleared by software while VPC is set, such that a subsequent ECONF instruction will latch the zero value and prevent further configuration until the next hard reset. | R/RW | Preset |

| Fields | | Description | Read/Write | Reset State |
|---|---|---|---|---|
| Name | Bits | | | |
| VPI | 30 | Virtual Processor Inhibit, if set, the virtual processor associated with the CPUNum value is inhibited from execution. If clear, VPE is started on ECONF. Thus the zero value necessary for direct software use as a base register is preserved for active VPE's. | R | Preset |

| Address Bits 4:3 Value | ITC Storage Behavior |
|---|---|
| 2#00 | Empty/Full Synchronized Storage Loads will cause the issueing thread to block if location is Empty, and reset the Empty state on returning a load value. Stores will cause the issueing thread to block if the location is Ful, and reset the full state on the location accepting a store value. |
| 2#01 | Force Empty/Full Loads/Stores do not block. Loads set Empty state. Stores set Full state, regardless of previous value. Load value returned is that of last value to the location (or unpredictable if never initialized). |
| 2#10 | Bypass Empty/Full Loads/Stores do not block, and do not affect Empty/Full. |
| 2#11 | Status Control Information |

| | Data Bit(s) | Meaning |
|---|---|---|
| 2#11 | 0 | If set, location is empty, and will block on attempt to store as synchronized storage |
| | 1 | If set, location is Full and will block on an attempt to store as synchronized storage. |
| | 2 | Load-Blocked Thread indication. Value of 1 if a load has blocked on the location since the last setting of the Empty bit; 0 otherwise. |
| | 3 | Store-blocked Thread indication. Value of 1 if a store has blocked on the location since the last setting of the Full bit, 0 otherwise. |
| | 63..4 | Implementation Dependent State. |

| 31 | 28 27 | 24 23 | 20 19 | 16 15 | 12 11 | 8 7 | 4 3 | 0 |
|---|---|---|---|---|---|---|---|---|
| | INV3 | INV2 | INV1 | INV0 | AND3 | AND2 | AND1 | AND0 |
| | 4 | 4 | 4 | 4 | 4 | 4 | 4 | 4 |

3602

| | |
|---|---|
| INV3 | Inversion mask 3. Mask XORed with incoming qualifiers YQ3..0 to create 4 bit Conditional Qualifier 3 |
| INV2 | Inversion mask 2. Mask XORed with incoming qualifiers YQ3..0 to create 4 bit Conditional Qualifier 2 |
| INV1 | Inversion mask 1. Mask XORed with incoming qualifiers YQ3..0 to create 4 bit Conditional Qualifier 1 |
| INV0 | Inversion mask 0. Mask XORed with incoming qualifiers YQ3..0 to create 4 bit Conditional Qualifier 0 |
| AND3 | AND-enabling term 3. Mask defining the set of Conditioned Qualifier 3 bits to be ANDed together (n-way) with an implicit 1 to generate Gated Qualifier 3 bit |
| AND2 | AND-enabling term 2. Mask defining the set of Conditioned Qualifier 2 bits to be ANDed together (n-way) with an implicit 1 to generate Gated Qualifier 2 bit |
| AND1 | AND-enabling term 1. Mask defining the set of Conditioned Qualifier 1 bits to be ANDed together (n-way) with an implicit 1 to generate Gated Qualifier 1 bit |
| AND0 | AND-enabling term 0. Mask defining the set of Conditioned Qualifier 0 bits to be ANDed together (n-way) with an implicit 1 to generate Gated Qualifier 0 bit |

SYSTEM, METHOD, AND COMPUTER PROGRAM PRODUCT FOR CONDITIONALLY SUSPENDING ISSUING INSTRUCTIONS OF A THREAD

CROSS REFERENCE TO RELATED APPLICATIONS

This application is a continuation of U.S. application Ser. No. 10/929,342, filed Aug. 27, 2004, now U.S. Pat. No. 7,321,965, which is a continuation-in-part of: (1) U.S. application Ser. No. 10/684,350, filed Oct. 10, 2003, now U.S. Pat. No. 7,376,954, and (2) U.S. application Ser. No. 10/684,348, filed Oct. 10, 2003, which are hereby incorporated by reference in their entirety for all purposes and which claim the benefit of: (1) U.S. Provisional Application No. 60/499,180, filed Aug. 28. 2003, (2) U.S. Provisional Application No. 60/502,358, filed Sep. 12, 2003, and (3) U.S. Provisional Application No. 60/502,359, filed Sep. 12, 2003, which are hereby incorporated by reference in their entirety for all purposes.

Additionally, this application is related to: (1) U.S. application Ser. No. 10/928,746, filed Aug. 27, 2004, (2) U.S. application Ser. No. 10/929,102, filed Aug. 27, 2004, (3) U.S. application Ser. No. 10/929,097, filed Aug. 27, 2004, now U.S. Pat. No. 7,424,599, (4) U.S. application Ser. No. 10/954,988, filed Sep. 20, 2004, (5) U.S. application Ser. No. 10/955,231, filed Sep. 20, 2004, now allowed, (6) U.S. application Ser. No. 11/313,272, filed Dec. 20, 2005, (7) U.S. application Ser. No. 11/313,296, filed Dec. 20, 2005, (8) U.S. application Ser. No. 11/330,914, filed Jan. 11, 2006, now U.S. Pat. No. 7,418,585, (9) U.S. application Ser. No. 11/330,916, filed Jan. 11, 2006, (10) U.S. application Ser. No. 11/330,915, filed Jan. 11, 2006, (11) U.S. application Ser. No. 11/615,960, filed Dec. 23, 2006, (12) U.S. application Ser. No. 11/615,963, filed Dec. 23, 2006, (13) U.S. application Ser. No. 11/615,964, filed Dec. 23, 2006, and (14) U.S. application Ser. No. 11/615,965, filed Dec. 23, 2006, which are hereby incorporated by reference in their entirety for all purposes.

FIELD OF THE INVENTION

The present invention is in the area of digital processors (e.g., microprocessors, digital signal processors, microcontrollers, etc.), and pertains more particularly to apparatus and methods relating to managing execution of multiple threads in a single processor.

BACKGROUND OF THE INVENTION

In the realm of digital computing the history of development of computing power comprises steady advancement in many areas. Steady advances are made, for example, in device density for processors, interconnect technology, which influences speed of operation, ability to tolerate and use higher clock speeds, and much more. Another area that influences overall computing power is the area of parallel processing, which includes more than the parallel operation of multiple, separate processors.

The concept of parallel processing includes the ability to share tasks among multiple, separate processors, but also includes schemes for concurrent execution of multiple programs on single processors. This scheme is termed generally multithreading.

The concept of multithreading is explained as follows: As processor operating frequency increases, it becomes increasingly difficult to hide latencies inherent in the operation of a computer system. A high-end processor which misses in its data cache on 1% of the instructions in a given application could be stalled roughly 50% of the time if it has a 50-cycle latency to off-chip RAM. If instructions directed to a different application could be executed when the processor is stalled during a cache miss, the performance of the processor could be improved and some or all of the memory latency effectively hidden. For example, FIG. 1A shows a single instruction stream 101 that stalls upon experiencing a cache miss. The supporting machine can only execute a single thread or task at a time. In contrast, FIG. 1B shows instruction stream 102 that may be executed while stream 101 is stalled. In this case, the supporting machine can support two threads concurrently and thereby more efficiently utilize its resources.

More generally, individual computer instructions have specific semantics, such that different classes of instructions require different resources to perform the desired operation. Integer loads do not exploit the logic or registers of a floating-point unit, any more than register shifts require the resources of a load/store unit. No single instruction consumes all of a processor's resources, and the proportion of the total processor resources that is used by the average instruction diminishes as one adds more pipeline stages and parallel functional units to high-performance designs.

Multithreading arises in large measure from the notion that, if a single sequential program is fundamentally unable to make fully efficient use of a processor's resources, the processor should be able to share some of those resources among multiple concurrent threads of program execution. The result does not necessarily make any particular program execute more quickly—indeed, some multithreading schemes actually degrade the performance of a single thread of program execution—but it allows a collection of concurrent instruction streams to run in less time and/or on a smaller number of processors. This concept is illustrated in FIGS. 2A and 2B, which show single-threaded processor 210 and dual-threaded processor 250, respectively. Processor 210 supports single thread 212, which is shown utilizing load/store unit 214. If a miss occurs while accessing cache 216, processor 210 will stall (in accordance with FIG. 1A) until the missing data is retrieved. During this process, multiply/divide unit 218 remains idle and underutilized. However, processor 250 supports two threads; i.e., 212 and 262. So, if thread 212 stalls, processor 250 can concurrently utilize thread 262 and multiply/divide unit 218 thereby better utilizing its resources (in accordance with FIG. 1B).

Multithreading on a single processor can provide benefits beyond improved multitasking throughput, however. Binding program threads to critical events can reduce event response time, and thread-level parallelism can, in principle, be exploited within a single application program.

Several varieties of multithreading have been proposed. Among them are interleaved multithreading, which is a time-division multiplexed (TDM) scheme that switches from one thread to another on each instruction issued. This scheme imposes some degree of "fairness" in scheduling, but implementations which do static allocation of issue slots to threads generally limit the performance of a single program thread. Dynamic interleaving ameliorates this problem, but is more complex to implement.

Another multithreading scheme is blocked multithreading, which scheme issues consecutive instructions from a single program thread until some designated blocking event, such as a cache miss or a replay trap, for example, causes that thread to be suspended and another thread activated. Because blocked multithreading changes threads less frequently, its implementation can be simplified. On the other hand, blocking is less "fair" in scheduling threads. A single thread can monopolize the processor for a long time if it is lucky enough to find all of its data in the cache. Hybrid scheduling schemes that combine elements of blocked and interleaved multithreading have also been built and studied.

Still another form of multithreading is simultaneous multithreading, which is a scheme implemented on superscalar processors. In simultaneous multithreading instructions from different threads can be issued concurrently. Assume for example, a superscalar reduced instruction set computer (RISC), issuing up to two instructions per cycle, and a simultaneously multithreaded superscalar pipeline, issuing up to two instructions per cycle from either of the two threads. Those cycles where dependencies or stalls prevented full utilization of the processor by a single program thread are filled by issuing instructions for another thread.

Simultaneous multithreading is thus a very powerful technique for recovering lost efficiency in superscalar pipelines. It is also arguably the most complex multithreading system to implement, because more than one thread may be active on a given cycle, complicating the implementation of memory access protection, and so on. It is perhaps worth noting that the more perfectly pipelined the operation of a central processing unit (CPU) may be on a given workload, the less will be the potential gain of efficiency for a multithreading implementation.

Multithreading and multiprocessing are closely related. Indeed, one could argue that the difference is only one of degree: whereas multiprocessors share only memory and/or connectivity, multithreaded processors share memory and/or connectivity, but also share instruction fetch and issue logic, and potentially other processor resources. In a single multithreaded processor, the various threads compete for issue slots and other resources, which limits parallelism. Some multithreaded programming and architectural models assume that new threads are assigned to distinct processors, to execute fully in parallel.

There are several distinct problems with the state-of-the-art multithreading solutions available at the time of submission of the present application. One of these is the treatment of real-time threads. Typically, real-time multimedia algorithms are run on dedicated processors/DSPs to ensure quality-of-service (QoS) and response time, and are not included in the mix of threads to be shared in a multithreading scheme, because one cannot easily guarantee that the real-time software will be executed in a timely manner.

What is clearly needed in this respect is a scheme and mechanism allowing one or more real-time threads or virtual processors to be guaranteed a specified proportion of instruction issue slots in a multithreaded processor, with a specified inter-instruction interval, such that the compute bandwidth and response time is well defined. If such a mechanism were available, threads with strict QoS requirements could be included in the multithreading mix. Moreover, real time threads (such as DSP-related threads) in such a system might be somehow exempted from taking interrupts, removing an important source of execution time variability. This sort of technology could well be critical to acceptance of DSP-enhanced RISC processors and cores as an alternative to the use of separate RISC and DSP cores in consumer multimedia applications.

Another distinct problem with state-of-the-art multithreading schemes at the time of filing the present application is in the creation and destruction of active threads in the processor. To support relatively fine-grained multithreading, it is desirable for parallel threads of program execution to be created and destroyed with the minimum possible overhead, and without intervention of an operating system being necessary, at least in usual cases. What is clearly needed in this respect is some sort of FORK (thread create) and JOIN (thread terminate) instructions. A separate problem exists for multithreaded processors where the scheduling policy makes a thread run until it is blocked by some resource, and where a thread which has no resource blockage needs nevertheless to surrender the processor to some other thread. What is clearly needed in this respect is a distinct PAUSE or YIELD instruction. Furthermore, the opcode space of a microprocessor instruction set is a valuable architectural resource, which may be limited, particularly in RISC instruction sets; consequently, what is needed is a means for combining two or more of the FORK, JOIN, and YIELD-type instructions into a single instruction decode to conserve opcode space.

BRIEF SUMMARY OF INVENTION

In one aspect, the present invention provides a microprocessor core. The microprocessor core includes a plurality of inputs, configured to indicate whether a corresponding plurality of independently occurring events has occurred. The plurality of inputs are non-memory address inputs. The microprocessor core also includes a yield instruction, included in the instruction set of the architecture of the microprocessor core, comprising a user-visible output operand and an explicit input operand. The input operand specifies one or more of the plurality of independently occurring events. The yield instruction instructs the microprocessor core to suspend issuing for execution instructions of a program thread until at least one of the independently occurring events specified by the input operand has occurred. The program thread contains the yield instruction. The yield instruction further instructs the microprocessor core to return a value in the output operand indicating which of the independently occurring events occurred to cause the microprocessor core to resume issuing the instructions of the program thread.

In yet another aspect, the present invention provides a method for conditionally suspending issuing instructions of a program thread in a microprocessor core having an instruction set of its architecture. The method includes receiving a plurality of inputs configured to indicate whether a corresponding plurality of independently occurring events has occurred. The plurality of inputs are non-memory address inputs. The method also includes issuing a yield instruction. The instruction is included in the instruction set of the architecture of the microprocessor core. The instruction includes a user-visible output operand and an explicit input operand. The input operand specifies one or more of the plurality of independently occurring events. The method also includes suspending issuing for execution instructions of a program thread until at least one of the independently occurring events specified by the input operand has occurred. The program thread contains the yield instruction. The method also includes returning a value in the output operand indicating which of the independently occurring events occurred to cause the microprocessor core to resume issuing the instructions of the program thread.

In yet another aspect, the present invention provides a computer program product for use with a computing device, the computer program product comprising a computer usable medium, having computer readable program code embodied in the medium, for providing a microprocessor core. The computer readable program code includes first program code for providing a plurality of inputs, configured to indicate whether a corresponding plurality of independently occurring events has occurred. The plurality of inputs are non-memory address inputs. The computer readable program code includes second program code for providing a yield instruction, included in the instruction set of the architecture of the microprocessor core, comprising a user-visible output operand and an explicit input operand. The input operand specifies one or more of the plurality of independently occurring events. The yield instruction instructs the microprocessor core to suspend issuing for execution instructions of a program thread until at least one of the independently occurring events specified by the input operand has occurred. The program thread contains the yield instruction. The yield instruction further instructs the microprocessor core to return a value in the output operand indicating which of the independently occurring events occurred to cause the microprocessor core to resume issuing the instructions of the program thread.

An advantage of the YIELD instruction is that it provides a means for a program to surrender execution of the processor to another thread with very little overhead, typically a single clock cycle in RISC fashion, and without requiring operating system involvement in the normal case. Hence, for example, an embedded system may convert interrupt service routines to distinct threads that include a YIELD instruction to suspend the thread until the interrupt source indicates an event, at which time the thread is rescheduled, thereby accomplishing essentially zero-overhead interrupt servicing. Advantageously, the YIELD instruction integrates the ability to efficiently suspend program thread execution and termination of a program thread into a single instruction, thereby conserving valuable opcode space within the instruction set. Finally, the fact that the present YIELD instruction provides a means for conditional termination of the thread based on the value of an input operand to the instruction enables multithreaded code to be more compact and to execute more efficiently in a microprocessor pipeline.

BRIEF DESCRIPTION OF THE DRAWINGS

FIG. 1A is a diagram showing a single instruction stream that stalls upon experiencing a cache miss.

FIG. 1B is a diagram showing an instruction stream that may be executed while the stream of FIG. 1a is stalled.

FIG. 15 is a table of system coprocessor privileged resources in an embodiment of the invention.

FIG. 19 is a table defining fields of the ThreadStatus register in an embodiment of the invention.

FIG. 26 is a table defining fields of the Config4 register in an embodiment of the invention.

FIG. 27 is a table defining Cause register ExcCode values required for thread exceptions.

FIG. 29 is a table defining Config3 register fields.

FIG. 30 is a table illustrating VPE inhibit bit per VPE context.

FIG. 31 is a table showing ITC storage behavior.

FIG. 40 is a block diagram illustrating a semantic of the rs register of the YIELD instruction of FIG. 35 according to an alternate embodiment according to the present invention.

DETAILED DESCRIPTION

Figure 2B:
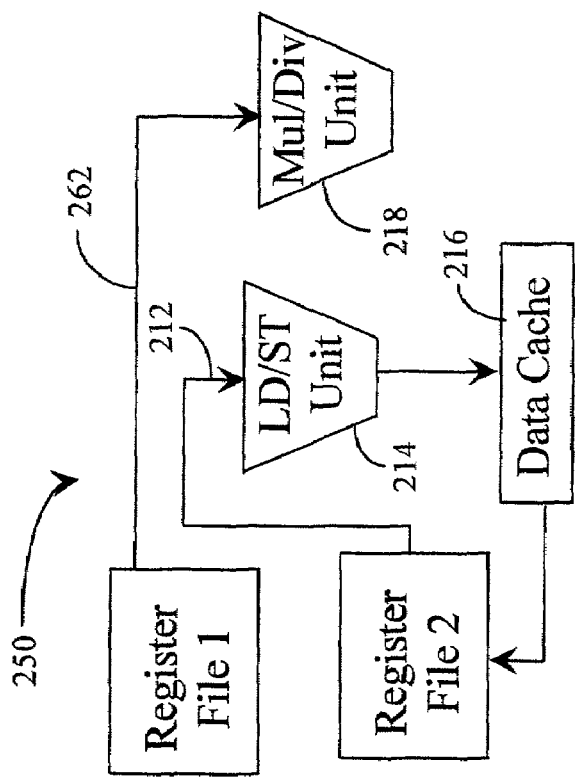
FIG. 2B is a diagram showing dual-threaded processor 250.
Figure 2A:
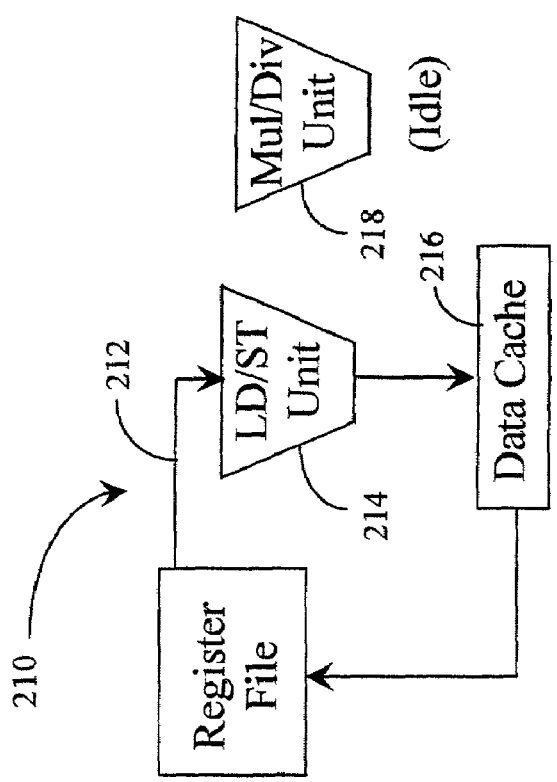
FIG. 2A is a diagram showing a single-threaded processor.

In one embodiment of the present invention, a processor architecture includes an instruction set comprising features, functions and instructions enabling multithreading on a compatible processor. The invention is not limited to any particular processor architecture and instruction set, but for exemplary purposes the well-known MIPS architecture, instruction set, and processor technology (collectively, "MIPS technology") is referenced, and embodiments of the invention described in enabling detail below are described in context with MIPS technology. Additional information regarding MIPS technology (including documentation referenced below) is available from MIPS Technologies, Inc. (located in Mountain View Calif.) and on the Web at www.mips.com (the company's website).

The terms "processor" and "digital processor" as used herein are intended to mean any programmable device (e.g., microprocessor, microcontroller, digital signal processor, central processing unit, processor core, etc.) in hardware (e.g., application specific silicon chip, FPGA, etc.), software (e.g., hardware description language, C, C+, etc.) or any other instantiation (or combination) thereof.

The terms "thread" and "program thread" as used herein have the same meaning. A thread is a sequence of computer instructions and the associated sequence of processor state changes associated with the execution of the instructions. The sequence of instructions typically, but not necessarily, includes one or more program control instructions, such as a branch instruction. Consequently, the instructions may or may not have consecutive memory addresses. The sequence of instructions is from a single program.

General Description

A "thread context" for purposes of description in embodiments of this invention is a collection of processor state necessary to describe the state of execution of an instruction stream in a processor. This state is typically reflected in the contents of processor registers. For example, in a processor that is compatible with the industry-standard MIPS32 and/or MIPS64 Instruction Set Architectures (a "MIPS Processor"), a thread context comprises a set of general purpose registers (GPRs), Hi/Lo multiplier result registers, some representation of a program counter (PC), and some associated privileged system control state. The system control state is retained in that portion of a MIPS Processor typically referred to as coprocessor zero ("CP0"), and is largely maintained by system control registers and (when used) a Translation Lookaside Buffer ("TLB"). In contrast, a "processor context" is a larger collection of processor state, which includes at least one thread context. Referring again to a MIPS Processor, a processor context in this case would include at least one thread context (as described above) as well as the CP0 and system state necessary to describe an instantiation of the well-known MIPS32 or MIPS64 Privileged Resource Architecture ("PRA"). (In brief, a PRA is a set of environments and capabilities upon which an instruction set architecture operates. The PRA provides the mechanisms necessary for an operating system to manage the resources of a processor; e.g., virtual memory, caches, exceptions and user contexts.)

In accordance with one embodiment of the present invention, a multithreading application-specific extension ("Multithreading ASE") to an instruction set architecture and PRA allows two distinct, but not mutually-exclusive, multithreading capabilities to be included within a given processor. First, a single processor can contain some number of processor contexts, each of which can operate as an independent processing element through the sharing of certain resources in the processor and supporting an instruction set architecture. These independent processing elements are referred to herein as Virtual Processing Elements ("VPEs"). To software, an N VPE processor looks exactly like an N-way symmetric multiprocessor ("SMP"). This allows existing SMP-capable operating systems to manage the set of VPEs, which transparently share the processor's execution units.

Figure 3:
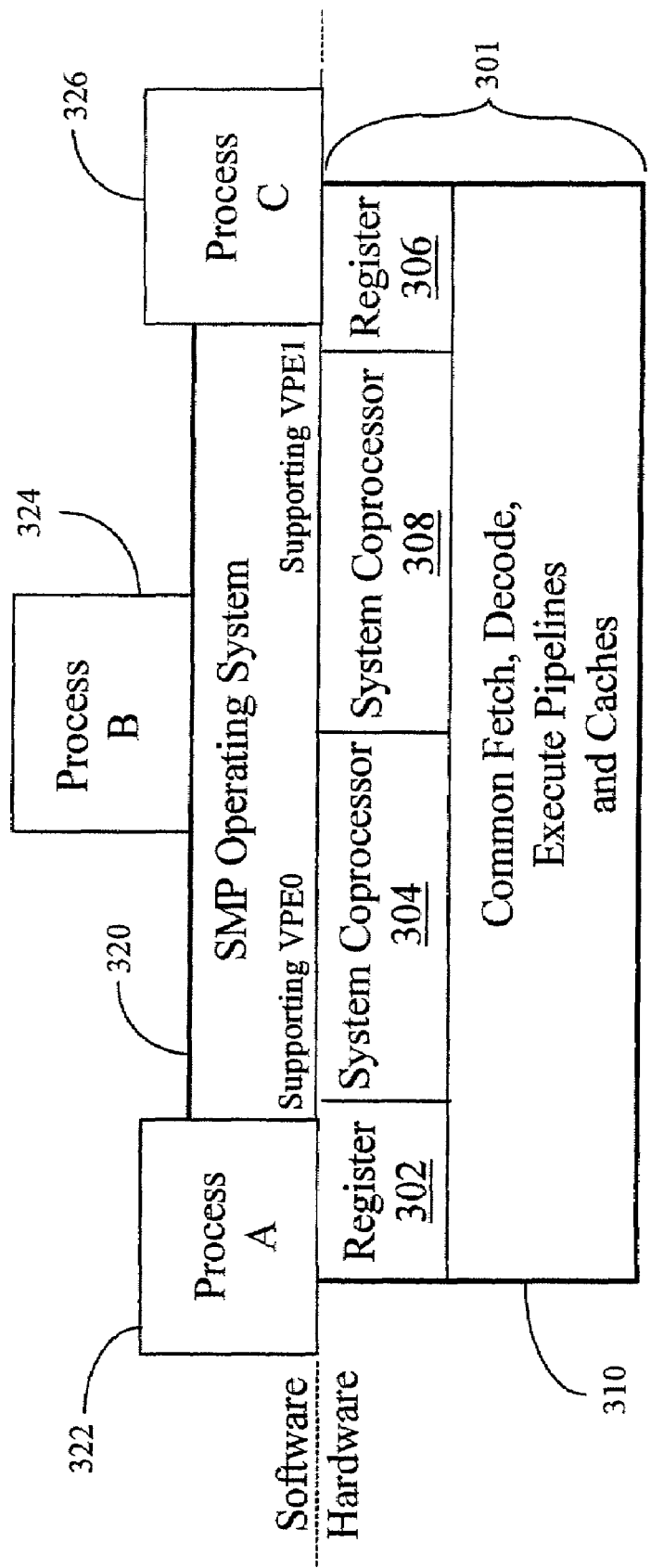
FIG. 3 is a diagram illustrating a processor supporting a first and a second VPE in an embodiment of the present invention.

FIG. 3 illustrates this capability with single processor 301 supporting a first VPE ("VPE0") that includes register state zero 302 and system coprocessor state zero 304. Processor 301 also supports a second VPE ("VPE1") that includes register state one 306 and system coprocessor state one 308. Those portions of processor 301 shared by VPE0 and VPE1 include fetch, decode, and execute pipelines, and caches 310. The SMP-capable operating system 320, which is shown running on processor 301, supports both VPE0 and VPE1. Software Process A 322 and Process C 326 are shown running separately on VPE0 and VPE1, respectively, as if they were running on two different processors. Process B 324 is queued and may run on either VPE0 or VPE1.

The second capability allowed by the Multithreading ASE is that each processor or VPE can also contain some number of thread contexts beyond the single thread context required by the base architecture. Multi-threaded VPEs require explicit operating system support, but with such support they provide a lightweight, fine-grained multithreaded programming model wherein threads can be created and destroyed without operating system intervention in typical cases, and where system service threads can be scheduled in response to external conditions (e.g., events, etc.) with zero interrupt latency.

Figure 4:
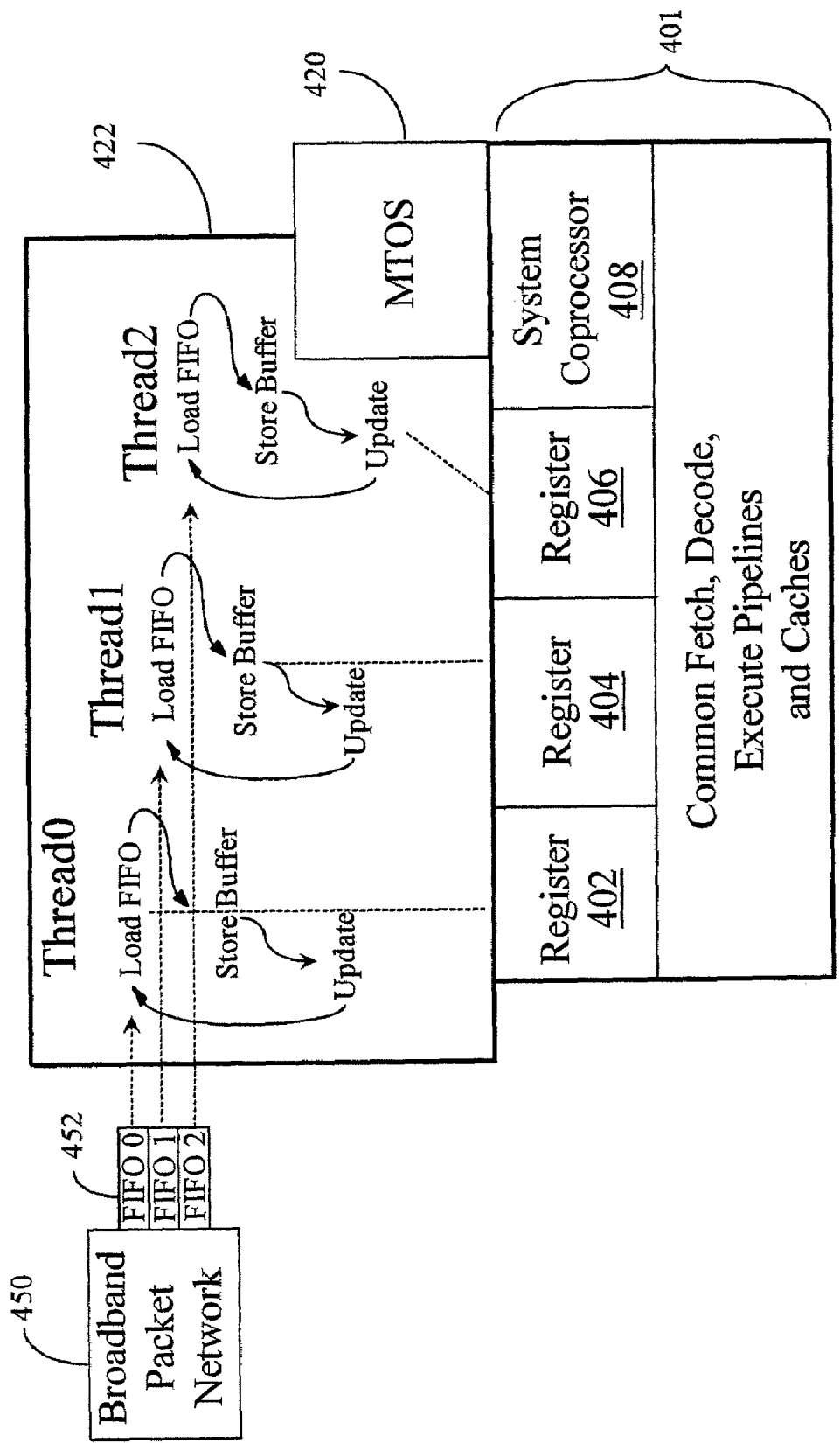
FIG. 4 is a diagram illustrating a processor supporting a single VPE which in turn supports three threads in an embodiment of the invention.

FIG. 4 illustrates this second capability with processor 401 supporting a single VPE that includes register state 402, 404 and 406 (supporting three threads 422), and system coprocessor state 408. Unlike FIG. 3, in this instance three threads are in a single application address space sharing CP0 resources (as well as hardware resources) on a single VPE. Also shown is a dedicated multithreading operating system 420. In this example, the multithreaded VPE is handling packets from a broadband network 450, where the packet load is spread across a bank of FIFOs 452 (each with a distinct address in the I/O memory space of the multithreaded VPE). The controlling application program creates as many threads as it has FIFOs to serve, and puts each thread into a tight loop reading the FIFOs.

A thread context may be in one of four states. It may be free, activated, halted, or wired. A free thread context has no valid content and cannot be scheduled to issue instructions. An activated thread context will be scheduled according to implemented policies to fetch and issue instructions from its program counter. A halted thread context has valid content, but is inhibited from fetching and issuing instructions. A wired thread context has been assigned to use as Shadow Register storage, which is to say that is held in reserve for the exclusive use of an exception handler, to avoid the overhead of saving and restoring register contexts in the handler. A free thread context is one that is neither activated, nor halted, nor wired. Only activated thread contexts may be scheduled. Only free thread contexts may be allocated to create new threads.

To allow for fine-grained synchronization of cooperating threads, an inter-thread communication ("ITC") memory space is created in virtual memory, with empty/full bit semantics to allow threads to be blocked on loads or stores until data has been produced or consumed by other threads.

Thread creation/destruction, and synchronization capabilities function without operating system intervention in the general case, but the resources they manipulate are all virtualizable via an operating system. This allows the execution of multithreaded programs with more virtual threads than there are thread contexts on a VPE, and for the migration of threads to balance load in multiprocessor systems.

At any particular point in its execution, a thread is bound to a particular thread context on a particular VPE. The index into that VPE's set of thread contexts provides a unique identifier at that point in time. But context switching and migration can cause a single sequential thread of execution to have a series of different thread indices, for example on a series of different VPEs.

Dynamic binding of thread contexts, TLB entries, and other resources to multiple VPEs on the same processor is performed in a special processor reset configuration state. Each VPE enters its reset vector exactly as if it were a separate processor.

Multithreaded Execution and Exception Model

The Multithreading ASE does not impose any particular implementation or scheduling model on the execution of parallel threads and VPEs. Scheduling may be round-robin, time-sliced to an arbitrary granularity, or simultaneous. An implementation must not, however, allow a blocked thread to monopolize any shared processor resource which could produce a hardware deadlock.

In a MIPS Processor, multiple threads executing on a single VPE all share the same system coprocessor (CP0), the same TLB and the same virtual address space. Each thread has an independent Kernel/Supervisor/User state for the purposes of instruction decode and memory access. When an exception is taken, all threads other than the one taking the exception are stopped and suspended until the EXL and ERL bits of the Status word are cleared, or, in the case of an EJTAG Debug exception, the Debug state is exited. The Status word resides in the status register, which is located in CP0. Details regarding the EXL and ERL bits as well as EJTAG debug exceptions may be found in the following two publications, each of which is available from MIPS Technologies, Inc. and hereby incorporated by reference in its entirety for all purposes: *MIPS32™ Architecture for Programmers Volume III: The MIPS32™ Privileged Resource Architecture*, Rev. 2.00, MIPS Technologies, Inc. (2003), and *MIPS64™ Architecture for Programmers Volume III: The MIPS64™ Privileged Resource Architecture*, Rev. 2.00, MIPS Technologies, Inc. (2003). Exception handlers for synchronous exceptions caused by the execution of an instruction stream, such as TLB miss and floating-point exceptions, are executed by the thread executing the instruction stream in question. When an unmasked asynchronous exception, such as an interrupt, is raised to a VPE, it is implementation dependent which thread executes the exception handler.

Each exception is associated with a thread context, even if shadow register sets are used to run the exception handler. This associated thread context is the target of all RDPGPR and WRPGPR instructions executed by the exception handler. Details regarding the RDPGPR and WRPGPR instructions (used to access shadow registers) may be found in the following two publications, each of which is available from MIPS Technologies, Inc. and hereby incorporated by reference in its entirety for all purposes: *MIPS32™ Architecture for Programmers Volume II: The MIPS32™ Instruction Set*, Rev. 2.00, MIPS Technologies, Inc. (2003), and *MIPS64™ Architecture for Programmers Volume II: The MIPS64™ Instruction Set*, Rev. 2.00, MIPS Technologies, Inc. (2003).

The Multithreading ASE includes two exception conditions. The first of these is a Thread Unavailable condition, wherein a thread allocation request cannot be satisfied. The second is a Thread Underflow condition, wherein the termination and de-allocation of a thread leaves no threads allocated on a VPE. These two exception conditions are mapped to a single new Thread exception. They can be distinguished based on CP0 register bits set when the exception is raised.

Instructions

The Multithreading ASE in an embodiment includes seven instructions. FORK and YIELD instructions control thread allocation, deallocation, and scheduling, and are available in all execution modes if implemented and enabled. MFTR and MTTR instructions are system coprocessor (Cop0) instructions available to privileged system software for managing thread state. A new EMT instruction and a new DMT instruction are privileged Cop0 instructions for enabling and disabling multithreaded operation of a VPE. Finally, a new ECONF instruction is a privileged Cop0 instruction to exit a special processor configuration state and re-initialize the processor.

FORK—Allocate and Schedule a New Thread

Figure 5:
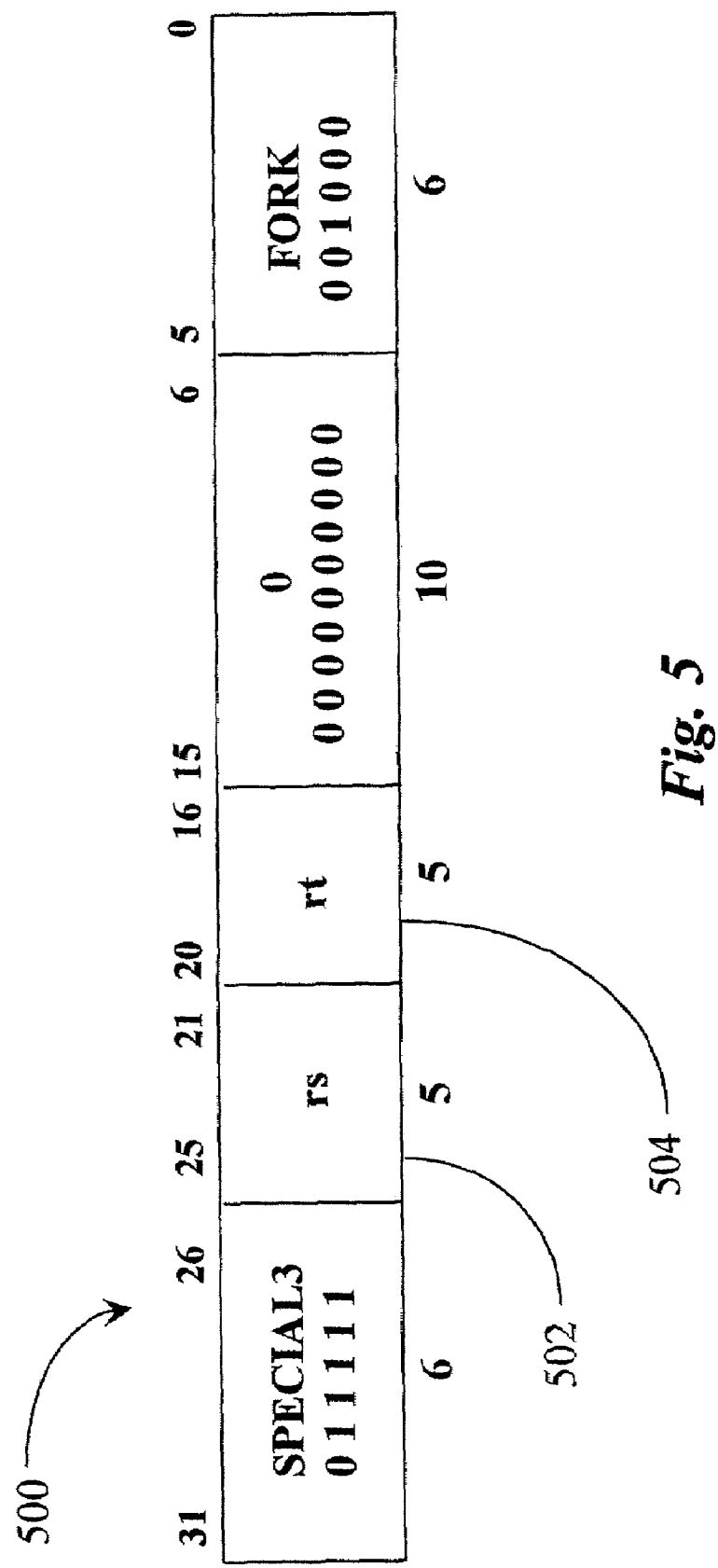
FIG. 5 shows format for a FORK instruction in an embodiment of the invention.
Figure 21:
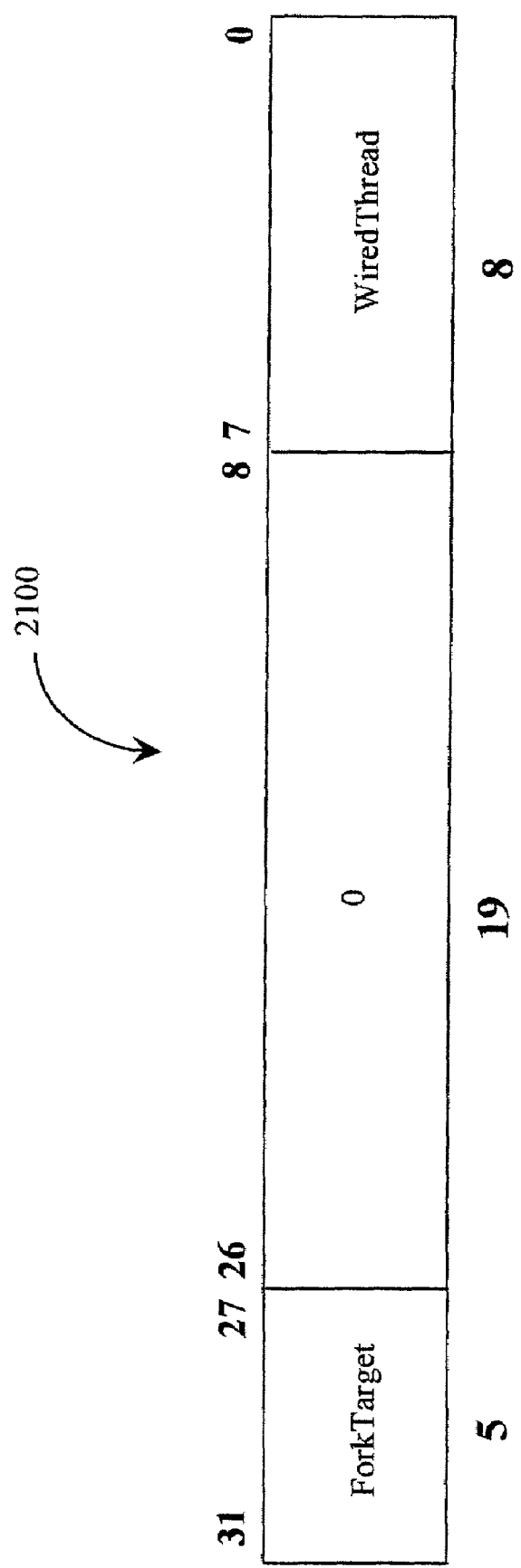
FIG. 21 shows layout of a ThreadConfig register in an embodiment of the invention.

The FORK instruction causes a free thread context to be allocated and activated. Its format 500 is shown in FIG. 5. The FORK instruction takes two operand values from GPRs identified in fields 502 (rs) and 504 (rt). The contents of GPR rs is used as the starting fetch and execution address for the new thread. The contents of GPR rt is a value to be transferred into a GPR of the new thread. The destination GPR is determined by the value of the ForkTarget field of the ThreadConfig register of CP0, which is shown in FIG. 21 and described below. The new thread's Kernel/Supervisor/User state is set to that of the FORKing thread. If no free thread context is available for the fork, a Thread Exception is raised for the FORK instruction.

YIELD—De-schedule and Conditionally Deallocate a Thread (First Embodiment)

Figure 6:
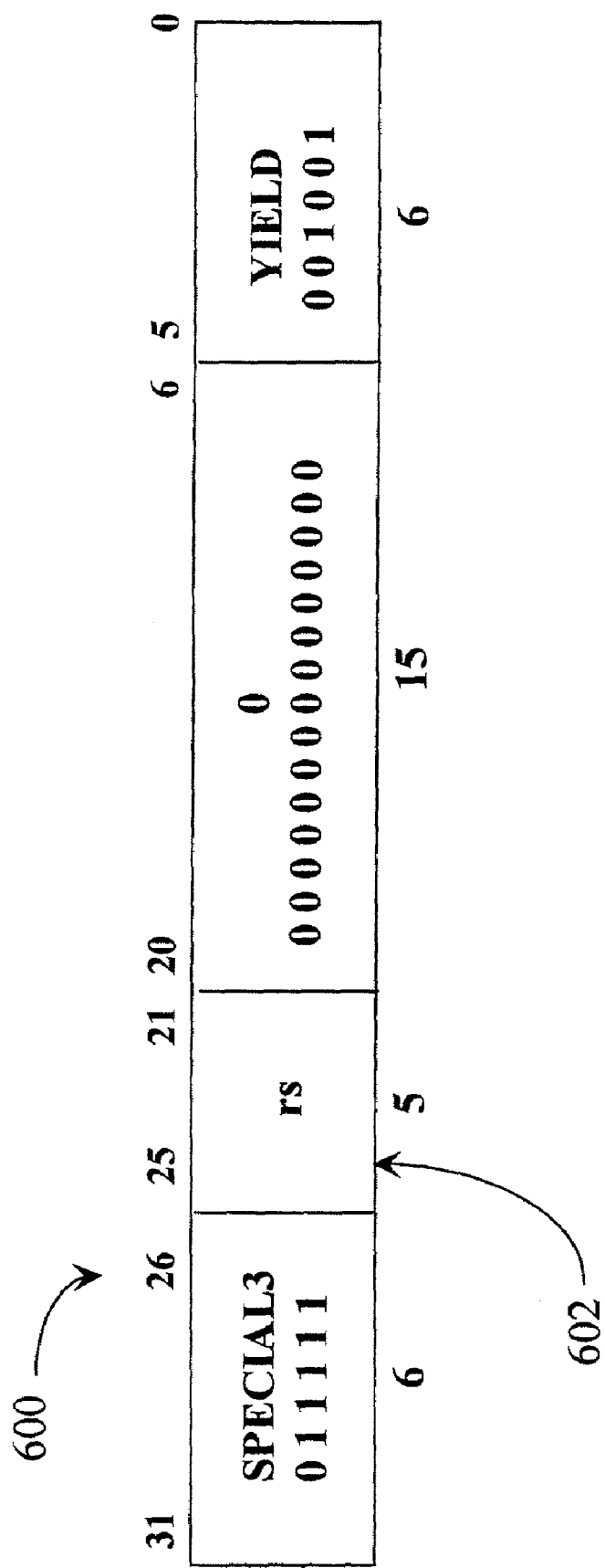
FIG. 6 shows format for a YIELD instruction in a first embodiment of the invention.
Figure 32:
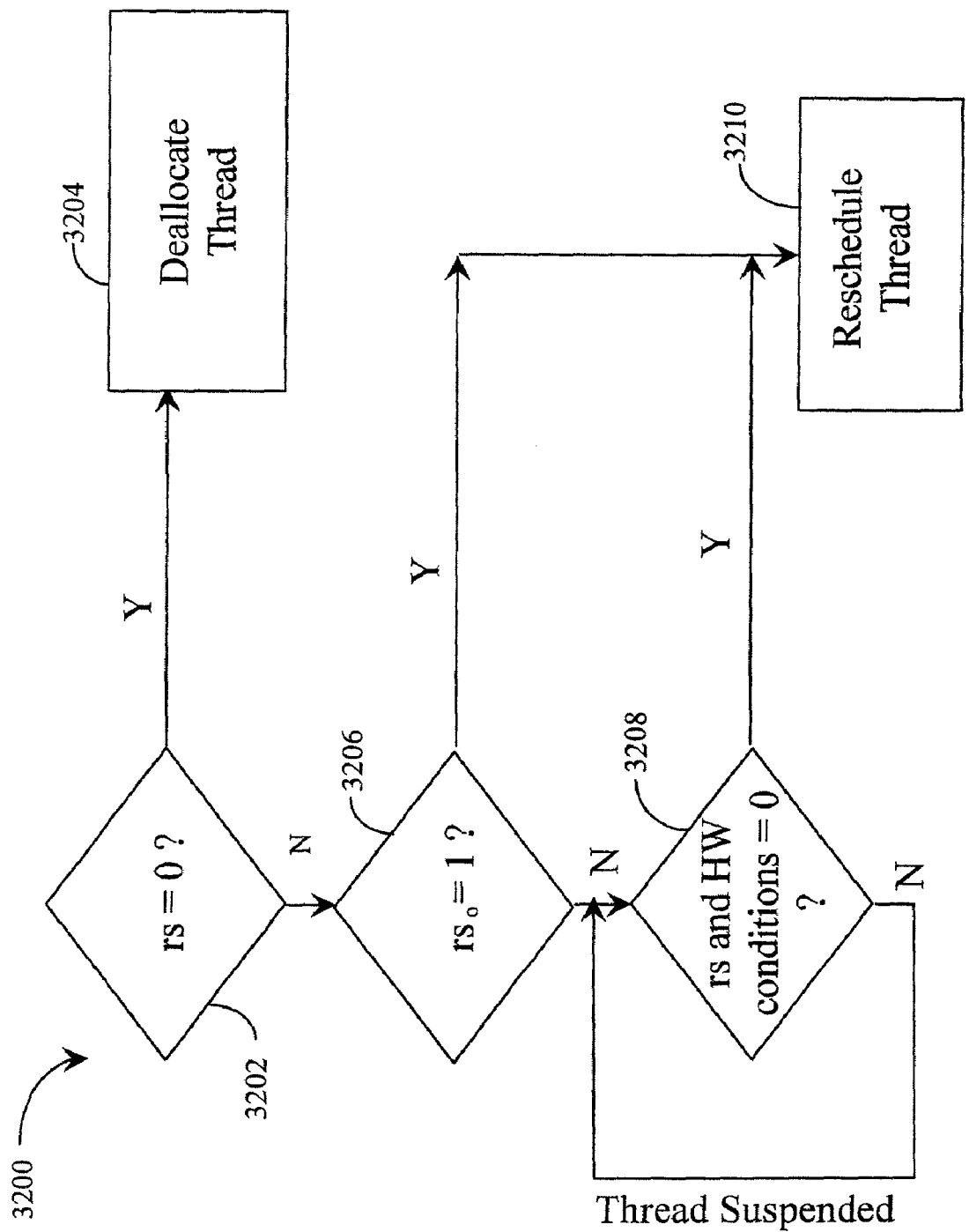
FIG. 32 is a flow diagram illustrating operation of a YIELD function in an embodiment of the invention.

The YIELD instruction causes the current thread to be selectively de-scheduled. The format of a YIELD instruction 600, according to a first embodiment, is shown in FIG. 6, and FIG. 32 is a flow chart 3200 illustrating operation of a system in an embodiment of the invention to assert the function of the YIELD instruction of FIG. 6. A second embodiment of the YIELD instruction 3500 is described below with respect to FIGS. 35 through 40.

The YIELD instruction 600 takes a single operand value from, for example, a GPR identified in field 602 (rs). A GPR is used in one embodiment, but in alternative embodiments the operand value may be stored in and retrieved from essentially any data storage device (e.g., non-GPR register, memory, etc.) accessible to the system. In one embodiment, contents of GPR rs can be thought of as a descriptor of the circumstances under which the issuing thread should be rescheduled. If the contents of GPR rs is zero (i.e., the value of the operand is zero), as shown in step 3202 of FIG. 32, the thread is not to be rescheduled at all, and it is instead deallocated (i.e., terminated or otherwise permanently stopped from further execution) as indicated in step 3204, and its associated thread context storage (i.e., the registers identified above to save state) freed for allocation by a subsequent FORK instruction issued by some other thread. If the least significant bit of the GPR rs is set (i.e., $rs_0=1$), the thread is immediately re-schedulable as shown in step 3206 of FIG. 32, and may promptly continue execution if there are no other runnable threads that would be preempted. The contents of GPR rs, in this embodiment, is otherwise treated as a 15-bit qualifier mask described by table 700 of FIG. 7 (i.e., a bit vector encoding a variety of conditions).

Referring to table 700, bits 15 to 10 of the GPR rs indicate hardware interrupt signals presented to the processor, bits 9 and 8 indicate software interrupts generated by the processor, bits 7 and 6 indicate the operation of the Load Linked and Store Conditional synchronization primitives of the MIPS architecture, and bits 5 to 2 indicate non-interrupt external signals presented to the processor.

Figure 7:
FIG. 7 is a table showing a 16-bit qualifier mask for GPR rs.

If the content of GPR rs is even (i.e., bit zero is not set), and any other bit in the qualifier mask of GPR rs is set (step 3208), the thread is suspended until at least one corresponding condition is satisfied. If and when such a situation occurs, the thread is rescheduled (step 3210) and resumes execution at the instruction following the YIELD instruction 600. This enabling is unaffected by the CP0.Status.IMn interrupt mask bits, so that up to 10 external conditions (e.g., events, etc.) encoded by bits 15 to 10 and 5 to 2 (as shown in FIG. 7) and four software conditions encoded by bits 9 to 6 (as shown in FIG. 7) can be used in the present embodiment to enable independent threads to respond to external signals without any need for the processor to take an exception. In this particular example there are six hardware interrupts and four non-interrupt signals, plus two software interrupts and two non-interrupt signals, and a single dedicated rescheduling function (i.e., $rs_0$) for a total of fifteen conditions. (The CP0.Status.iMn interrupt mask bits are a set of 8 bits in the CP0 Status register which can optionally mask the 8 basic interrupt inputs to a MIPS Processor. If an IM bit is set, the associated interrupt input will not cause an exception to the processor when asserted.)

In EIC interrupt mode, the IP2-IP7 bits encode the value of the highest priority enabled interrupt, rather than express a vector of orthogonal indications. The GPR rs bits associated with IP2-IP7 in a YIELD instruction 600 when the processor is using EIC interrupt mode can thus no longer be used to re-enable thread scheduling on a specific external event. In EIC mode, only the system-dependent external event indications (i.e., bits 5 to 2 of the GPR rs of the present embodiment) should be used as YIELD qualifiers. The EIC interrupt mode and IP2-IP7 bits are further described in the following publications as fully identified and incorporated above: *MIPS32™ Architecture for Programmers Volume III: The MIPS32™ Privileged Resource Architecture*, and *MIPS64™ Architecture for Programmers Volume III: The MIPS64™ Privileged Resource Architecture*.

If the execution of a YIELD 600 results in the de-allocation of the last allocated thread on a processor or VPE, a Thread Exception, with an underflow indication in the ThreadStatus register of CP0(shown in FIG. 18 and described below), is raised on the YIELD instruction 600.

The foregoing embodiment utilizes the operand contained in the GPR rs of the YIELD instruction 600 as a thread-scheduling parameter. In this case, the parameter is treated as a 15-bit vector of orthogonal indications (referring to FIG. 7, bits 1 and 15 are reserved so there are only 15 conditions encoded in this embodiment). This embodiment also treats the parameter as a designated value (i.e., to determine whether or not a given thread should be deallocated, see step 3202 of FIG. 32). The characteristics of such a parameter may be changed, however, to accommodate different embodiments of the instruction. For example, rather than rely on the least significant bit (i.e., $rs_0$) to determine whether a thread is immediately re-schedulable, the value of the parameter itself (e.g., a value of minus one {−1} in two's complement form) may be used to determine whether a thread should be rescheduled without additional delay (i.e., re-queued for scheduling).

Other embodiments of this instruction may treat such a thread-scheduling parameter as containing one or more multi-bit value fields so that a thread can specify that it will yield on a single event out of a large (e.g., 32-bit, or larger) event name space. In such an embodiment, at least the bits associated with the one target event would be accessed by the subject YIELD instruction 600. Of course, additional bit fields could be passed to the instruction (associated with additional events) as desired for a particular embodiment.

Other embodiments of the YIELD instruction 600 may include a combination of the foregoing bit vector and value fields within a thread-scheduling parameter accessed by the instruction, or other application-specific modifications and enhancements to (for example) satisfy the needs of a specific implementation. Alternative embodiments of the YIELD instruction 600 may access such a thread-scheduling parameter as described above in any conventional way; e.g., from a GPR (as shown in FIG. 6), from any other data storage device (including memory) and as an immediate value within the instruction itself.

MFTR—Move From Thread Register

Figure 8:
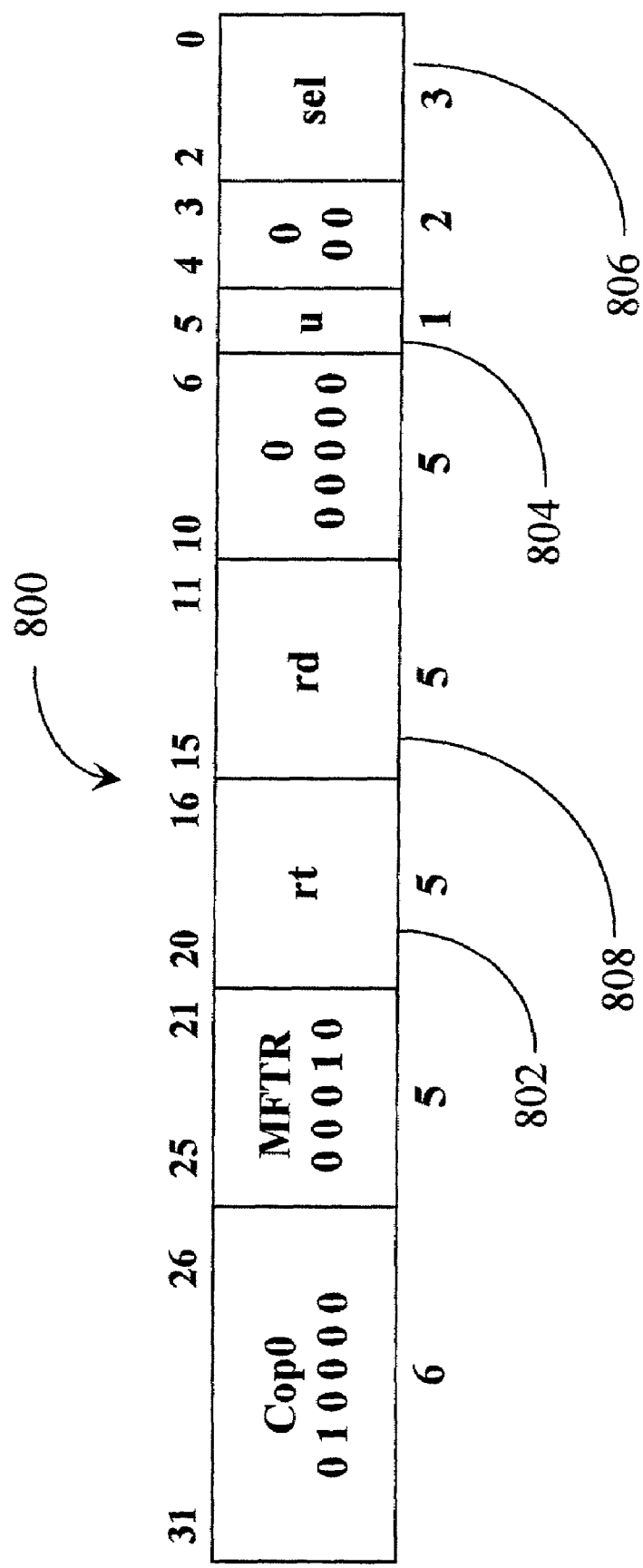
FIG. 8 shows format for a MFTR instruction in an embodiment of the invention.

The MFTR instruction is a privileged (Cop0) instruction which allows an operating system executing on one thread to access a different thread context. Its format 800 is shown in FIG. 8.

Figure 9:
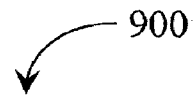
FIG. 9 is a table for interpreting fields of the MFTR instruction in an embodiment of the invention.
Figure 16:
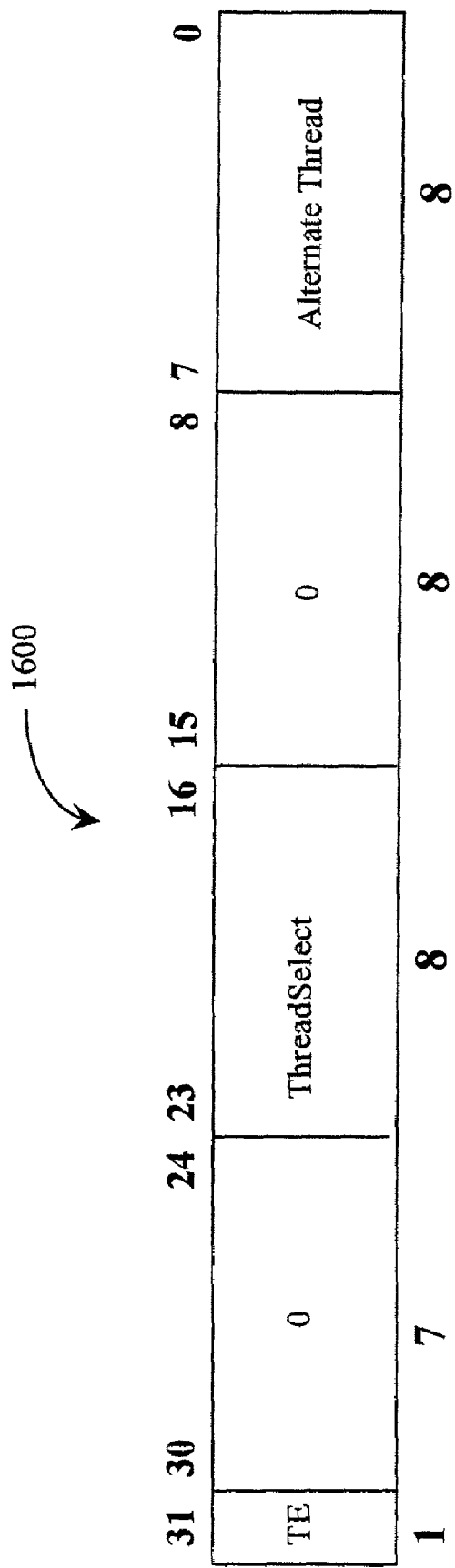
FIG. 16 shows layout of a ThreadControl register in an embodiment of the invention.

The thread context to be accessed is determined by the value of the AlternateThread field of the ThreadControl register of CP0, which is shown in FIG. 16 and described below. The register to be read within the selected thread context is determined by the value in the rt operand register identified in field 802, in conjunction with the u and sel bits of the MFTR instruction provided in fields 804 and 806, respectively, and interpreted according to table 900 included as FIG. 9. The resulting value is written into the target register rd, identified in field 808.

MTTR—Move to Thread Register

Figure 10:
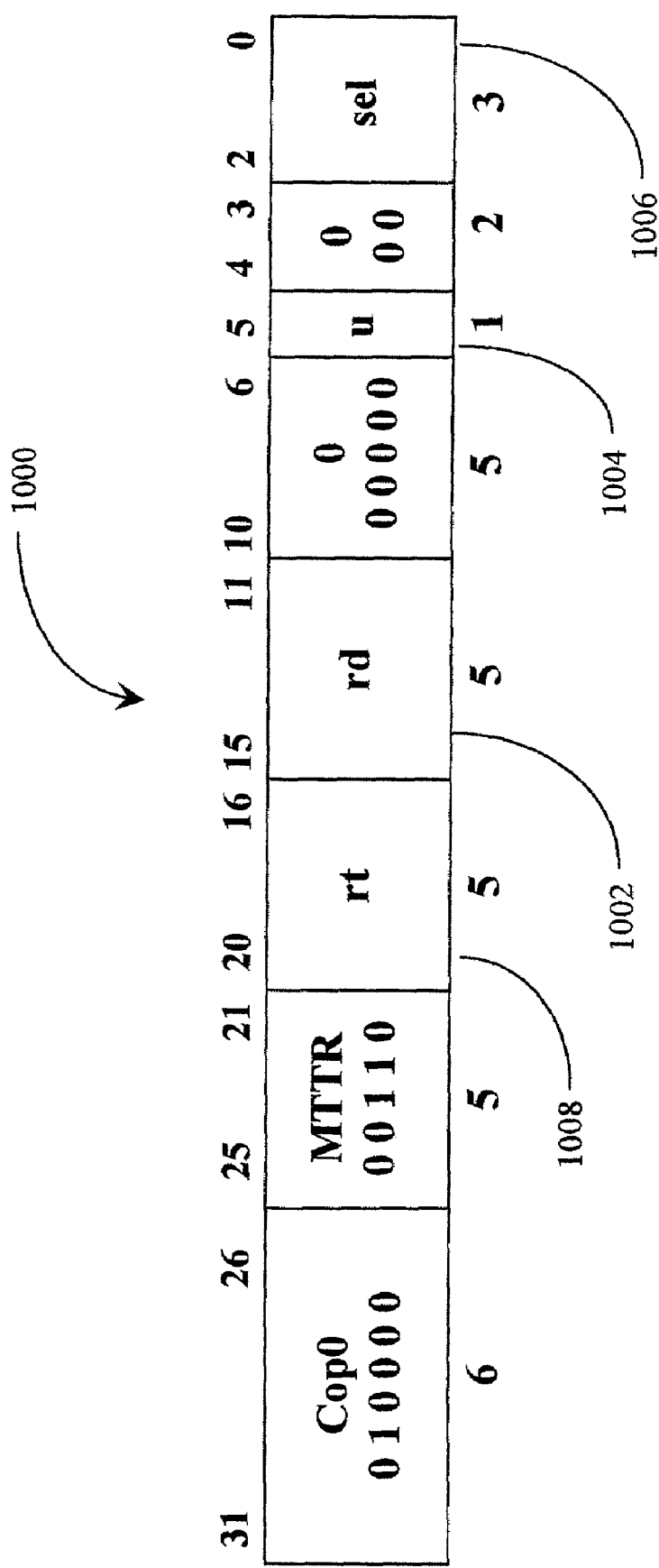
FIG. 10 shows format for a MTTR instruction in an embodiment of the invention.

The MTTR instruction is the inverse of MFTR. It is a privileged Cop0 instruction which copies a register value from the thread context of the current thread to a register within another thread context. Its format 1000 is shown in FIG. 10.

Figure 11:
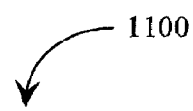
FIG. 11 is a table for interpreting u and sel bits of the MTTR instruction in an embodiment of the invention.

The thread context to be accessed is determined by the value of the AlternateThread field of the ThreadControl register of CP0, which is shown in FIG. 16 and described below. The register to be written within the selected thread context is determined by the value in the rd operand register identified in field 1002, in conjunction with the u and sel bits of the MTTR instruction provided in fields 1004 and 1006, respectively, and interpreted according to table 1100 provided in FIG. 11 (the encoding is the same as for MFTR). The value in register rt, identified in field 1008, is copied to the selected register.

EMT—Enable Multithreading

Figure 12:
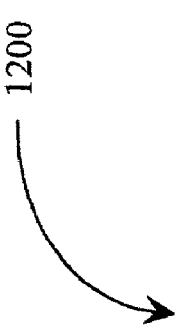
FIG. 12 shows format for an EMT instruction in an embodiment of the invention.

The EMT instruction is a privileged Cop0 instruction which enables the concurrent execution of multiple threads by setting the TE bit of the ThreadControl register of CP0, which is shown in FIG. 16 and described below. Its format 1200 is shown in FIG. 12. The value of the ThreadControl register, containing the TE (Threads Enabled) bit value prior to the execution of the EMT, is returned in register rt.

DMT—Disable Multithreading

Figure 13:
FIG. 13 shows format for a DMT instruction in an embodiment of the invention.

The DMT instruction is a privileged Cop0 instruction which inhibits the concurrent execution of multiple threads by clearing the TE bit of the ThreadControl register of CP0, which is shown in FIG. 16 and described below. Its format 1300 is shown in FIG. 13.

All threads other than the thread issuing the DMT instruction are inhibited from further instruction fetch and execution. This is independent of any per-thread halted state. The value of the ThreadControl register, containing the TE (Threads Enabled) bit value prior to the execution of the DMT, is returned in register rt.

ECONF—End Processor Configuration

Figure 14:
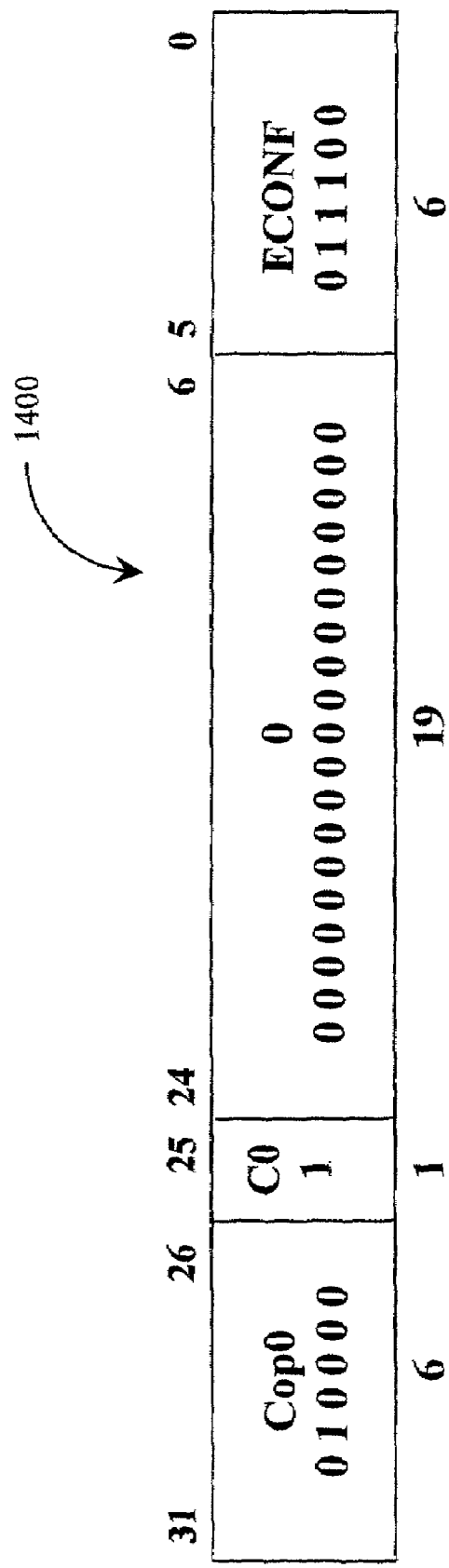
FIG. 14 shows format for an ECONF instruction in an embodiment of the invention.

The ECONF instruction is a privileged Cop0 instruction which signals the end of VPE configuration and enables multi-VPE execution. Its format 1400 is shown in FIG. 14.

When an ECONF is executed, the VPC bit of the Config3 register (described below) is cleared, the MVP bit of this same register becomes read-only at its current value, and all VPEs of a processor, including the one executing the ECONF, take a Reset exception. The ECONF instruction is not included in the alternate embodiment of FIGS. 35 through 40 Multithreading ASE.

Privileged Resources

The table 1500 of FIG. 15 outlines the system coprocessor privileged resources associated with the Multithreading ASE. Except where indicated otherwise, the new and modified coprocessor zero (CP0) registers identified below are accessible (i.e., written into and read from) like conventional system control registers of coprocessor zero (i.e., of a MIPS Processor).

New Privileged Resources (A) ThreadControl Register (Coprocessor 0 Register 7, Select 1)

Figure 17:
FIG. 17 is a table defining ThreadControl register fields in an embodiment of the invention.

The ThreadControl register is instantiated per VPE as part of the system coprocessor. Its layout 1600 is shown in FIG. 16. The ThreadControl Register fields are defined according to table 1700 of FIG. 17.

(B) ThreadStatus Register (Coprocessor 0 Register 12, Select 4)

Figure 18:
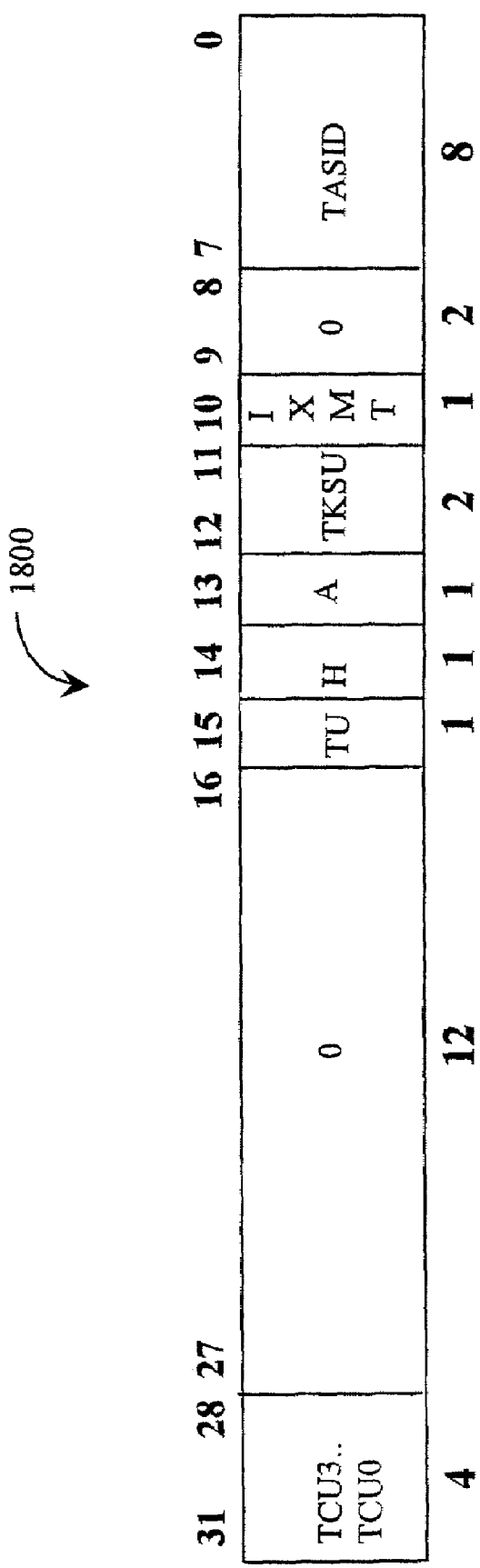
FIG. 18 shows layout for a ThreadStatus register in an embodiment of the invention.

The ThreadStatus register is instantiated per thread context. Each thread sees its own copy of ThreadStatus, and privileged code can access those of other threads via MFTR and MTTR instructions. Its layout 1800 is shown in FIG. 18. The ThreadStatus Register fields are defined in table 1900 of FIG. 19.

Writing a one to the Halted bit of an activated thread causes an activated thread to cease fetching instructions and to set its internal restart PC to the next instruction to be issued. Writing a zero to the Halted bit of an activated thread allows the thread to be scheduled, fetching and executing from the internal restart PC address. A one in either the Activated bit or the Halted bit of a non-activated thread prevents that thread from being allocated and activated by a FORK instruction.

(C) ThreadContext Register (Coprocessor 0 Register 4, Select 1)

Figure 20:
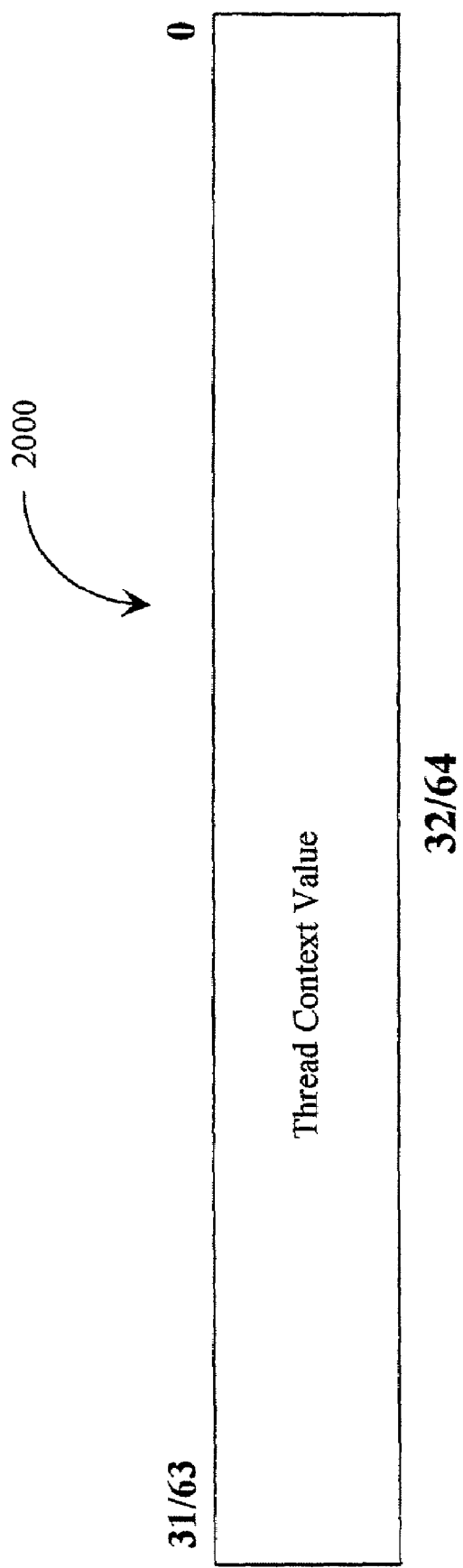
FIG. 20 shows layout of a ThreadContext register in an embodiment of the invention.

The ThreadContext register 2000 is instantiated perthread, with the same width as the processor GPRs, as shown in FIG. 20. This is purely a software read/write register, usable by the operating system as a pointer to thread-specific storage, e.g. a thread context save area.

(D) ThreadConfig Register (Coprocessor 0 Register 6, Select 1)

Figure 22:
FIG. 22 is a table defining fields of the ThreadConfig register in an embodiment of the invention.

The ThreadConfig register is instantiated per-processor or VPE. Its layout 2100 is shown in FIG. 21. The ThreadConfig registers fields are defined in table 2200 of FIG. 22.

The WiredThread field of ThreadConfig allows the set of thread contexts available on a VPE to be partitioned between Shadow Register sets and parallel execution threads. Thread contexts with indices less than the value of the WiredThread register are available as shadow register sets.

(E) ThreadSchedule Register (Coprocessor 0 Register 6, Select 2)

Figure 23:
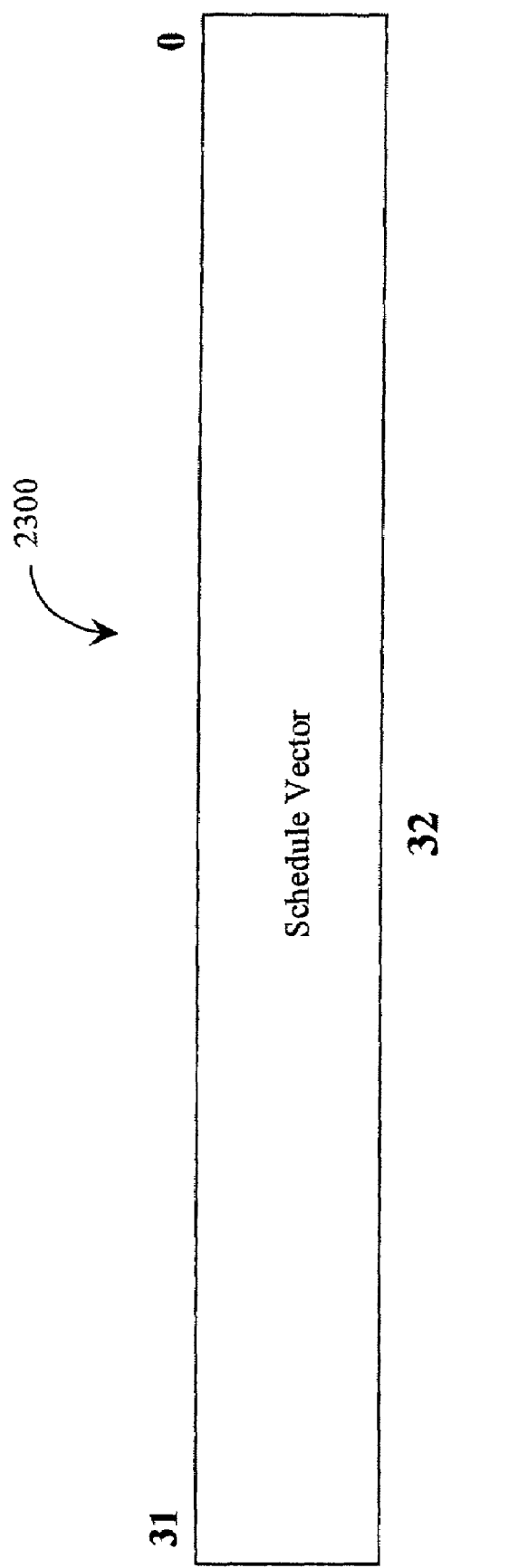
FIG. 23 shows layout of a ThreadSchedule register in an embodiment of the invention.

The ThreadSchedule register is optional, but when implemented is implemented per-thread. Its layout 2300 is shown in FIG. 23. The Schedule Vector (which, as shown, is 32 bits wide in one embodiment) is a description of the requested issue bandwidth scheduling for the associated thread. In this embodiment, each bit represents 1/32 of the issue bandwidth of the processor or VPE, and each bit location represents a distinct slot in a 32-slot scheduling cycle.

If a bit in a thread's ThreadSchedule register is set, that thread has a guarantee of the availability of one corresponding issue slot for every 32 consecutive issues possible on the associated processor or VPE. Writing a 1 to a bit in a thread's ThreadSchedule register when some other thread on the same processor or VPE already has the same ThreadSchedule bit set will result in a Thread exception. Although 32 bits is the width of the ThreadSchedule register in one embodiment, it is anticipated that this width may be altered (i.e., increased or decreased) when used in other embodiments.

(F) VPESchedule Register (Coprocessor 0 Register 6, Select 3)

Figure 24:
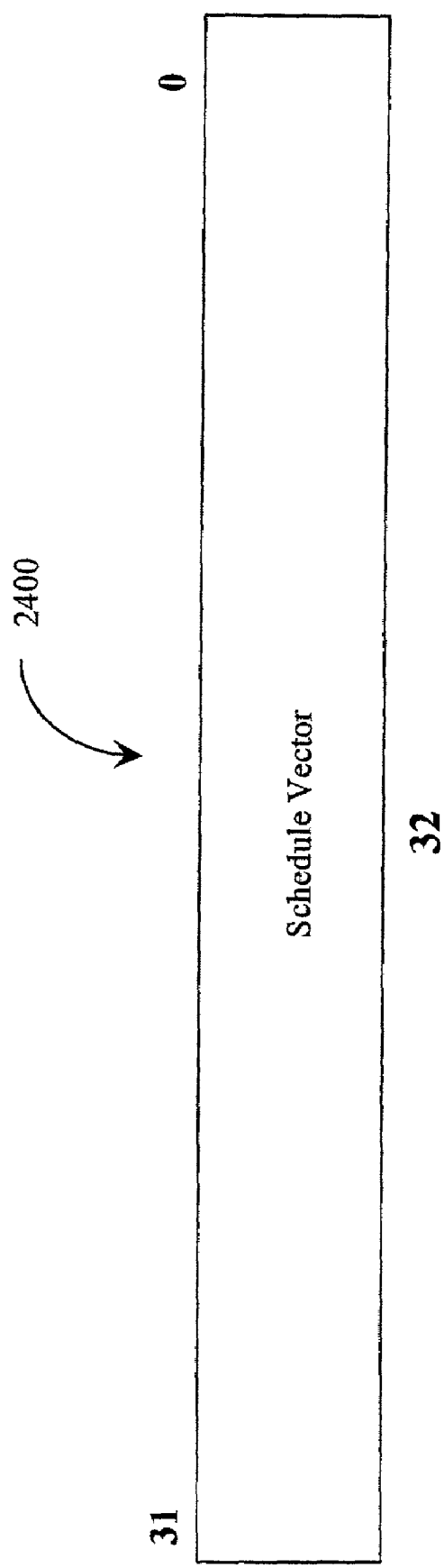
FIG. 24 shows layout of a VPESchedule register in an embodiment of the invention.

The VPESchedule register is optional, and is instantiated per VPE. It is writable only if the MVP bit of the Config3 register is set (see, FIG. 29). Its format 2400 is shown in FIG. 24.

The Schedule Vector (which, as shown, is 32 bits wide in one embodiment) is a description of the requested issue bandwidth scheduling for the associated VPE. In this embodiment, each bit represents 1/32 of the issue total bandwidth of a multiVPE processor, and each bit location represents a distinct slot in a 32-slot scheduling cycle.

If a bit in a VPE's VPESchedule register is set, that thread has a guarantee of the availability of one corresponding issue slot for every 32 consecutive issues possible on the processor. Writing a 1 to a bit in a VPE's VPESchedule register when some other VPE already has the same VPESchedule bit set will result in a Thread exception.

Issue slots not specifically scheduled by any thread are free to be allocated to any runnable VPE/thread according to the current default thread scheduling policy of the processor (e.g., round robin, etc.).

The VPESchedule register and the ThreadSchedule register create a hierarchy of issue bandwidth allocation. The set of VPESchedule registers assigns bandwidth to VPEs as a proportion of the total available on a processor or core, while the ThreadSchedule register assigns bandwidth to threads as a proportion of that which is available to the VPE containing the threads.

Although 32 bits is the width of the VPESchedule register in one embodiment, it is anticipated that this width may be altered (i.e., increased or decreased) when used in other embodiments.

(G) The Config4 Register (Coprocessor 0 Register 16, Select 4)

Figure 25:
FIG. 25 shows layout of a Config4 register in an embodiment of the invention.

The Config4 Register is instantiated per-processor. It contains configuration information necessary for dynamic multiVPE processor configuration. If the processor is not in a VPE configuration state (i.e., the VMC bit of the Config3 register is set), the value of all fields except the M (continuation) field is implementation-dependent and may be unpredictable. Its layout 2500 is shown in FIG. 25. The Config4's register fields are defined as shown in table 2600 of FIG. 26. In some embodiments there may be a VMC bit for the Config3 register, which can be a previously reserved/unassigned bit.

Modifications to Existing Privileged Resource Architecture

The Multithreading ASE modifies some elements of current MIPS32 and MIPS64 PRA.

(A) Status Register

The CU bits of the Status register take on additional meaning in a multithreaded configuration. The act of setting a CU bit is a request that a coprocessor context be bound to thread associated with the CU bit. If a coprocessor context is available, it is bound to the thread so that instructions issued by the thread can go to the coprocessor, and the CU bit retains the 1 value written to it. If no coprocessor context is available, the CU bit reads back as 0. Writing a 0 to a set CU bit causes any associated coprocessor to be deallocated.

(B) Cause Register

There is a new Cause register ExcCode value required for the Thread exceptions, as shown in FIG. 27.

(C) EntryLo Register

Figure 28:
FIG. 28 is a table defining ITC indicators.

A previously reserved cache attribute becomes the ITC indicator, as shown in FIG. 28.

(D) Config3 Register

There are new Config3 register fields defined to express the availability of the Multithreading ASE and of multiple thread contexts, as shown in table 2900 of FIG. 29.

(E) EBase

The previously reserved bit 30 of the EBase register becomes a VPE inhibit bit per VPE context, as is illustrated in FIG. 30.

(F) SRSCtl

The formerly preset HSS field now generated as a function of the ThreadConfig WiredThread field.

Thread Allocation and Initialization Without FORK

The procedure for an operating system to create a thread "by hand" in one embodiment is:

1. Execute a DMT to stop other threads from executing and possibly FORKing.
2. Identify an available ThreadContext by setting the AlternateThread field of the ThreadControl register to successive values and reading the ThreadStatus registers with MFTR instructions. A free thread will have neither the Halted nor the Activated bit of its ThreadStatus register set.
3. Set the Halted bit of the selected thread's ThreadStatus register to prevent it being allocated by another thread.
4. Execute an EMT instruction to re-enable multithreading.
5. Copy any desired GPRs into the selected thread context using MTTR instructions with the u field set to 1.
6. Write the desired starting execution address into the thread's internal restart address register using an MTTR instruction with the u and sel fields set to zero, and the rt field set to 14 (EPC).
7. Write a value with zero in the Halted bit and one in the Activated bit to the selected ThreadStatus register using an MTTR instruction.

The newly allocated thread will then be schedulable. The steps of executing DMT, setting the new thread's Halted bit, and executing EMT can be skipped if EXL or ERL are set during the procedure, as they implicitly inhibit multithreaded execution.

Thread Termination and Deallocation without YIELD

The procedure for an operating system to terminate the current thread in one embodiment is:

1. If the OS has no support for a Thread exception on a Thread Underflow state, scan the set of ThreadStatus registers using MFTR instructions to verify that there is another runnable thread on the processor, or, if not, signal the error to the program.
2. Write any important GPR register values to memory.
3. Set Kernel mode in the Status/ThreadStatus register.
4. Clear EXL/ERL to allow other threads to be scheduled while the current thread remains in a privileged state.
5. Write a value with zero in both the Halted and the Activated bits of the ThreadStatus register using a standard MTC0 instruction.

The normal procedure is for a thread to terminate itself in this manner. One thread, running in a privileged mode, could also terminate another, using MTTR instructions, but it would present an additional problem to the OS to determine which thread context should be deallocated and at what point the state of the thread's computation is stable.

Inter-Thread Communication Storage

Inter-Thread Communication (ITC) Storage is an optional capability which provides an alternative to Load-Linked/Store-Conditional synchronization for fine-grained multithreading. It is invisible to the instruction set architecture, as it is manipulated by loads and stores, but it is visible to the Privileged Resource Architecture, and it requires significant microarchitectural support.

References to virtual memory pages whose TLB entries are tagged as ITC storage resolve to a store with special attributes. Each page maps a set of 1-128 64-bit storage locations, each of which has an Empty/Full bit of state associated with it, and which can be accessed in one of 4 ways, using standard load and store instructions. The access mode is encoded in the least significant (and untranslated) bits of the generated virtual address, as shown in table 3100 of FIG. 31.

Each storage location could thus be described by the C structure:

```
struct {
    uint64 ef_sync_location;
    uint64 force_ef_location;
    uint64 bypass_location;
    uint64 ef_state;
} ITC_location;
``` where all four of the locations reference the same 64 bits of underlying storage. References to this storage may have access types of less than 64 bits (e.g. LW, LH, LB), with the same Empty/Full protocol being enforced on a per-access basis.

Empty and Full bits are distinct so that decoupled multi-entry data buffers, such as FIFOs can be mapped into ITC storage.

ITC storage can be saved and restored by copying the {bypass_location, ef_state} pair to and from general storage. While 64 bits of bypass_location must be preserved, strictly speaking, only the least significant bits of the ef_state need to be manipulated. In the case of multi-entry data buffers, each location must be read until Empty to drain the buffer on a copy.

The number of locations per 4K page and the number of ITC pages per VPE are configuration parameters of the VPE or processor.

The "physical address space" of ITC storage can be made global across all VPEs and processors in a multiprocessor system, such that a thread can synchronize on a location on a different VPE from the one on which it is executing. Global ITC storage addresses are derived from the CPUNum field of each VPE's EBase register. The 10 bits of CPUNum correspond to 10 significant bits of the ITC storage address. Processors or cores designed for uniprocessor applications need not export a physical interface to the ITC storage, and can treat it as a processor-internal resource.

Multi-VPE Processors

A core or processor may implement multiple VPEs sharing resources such as functional units. Each VPE sees its own instantiation of the MIPS32 or MIPS64 instruction and privileged resource architectures. Each sees its own register file or thread context array, each sees its own CP0 system coprocessor and its own TLB state. Two VPEs on the same processor are indistinguishable to software from a 2-CPU cache-coherent SMP multiprocessor.

Each VPE on a processor sees a distinct value in the CPUNum field of the Ebase register of CP0.

Processor architectural resources such as thread context and TLB storage and coprocessors may be bound to VPEs in a hardwired configuration, or they may be configured dynamically in a processor supporting the necessary configuration capability.

Reset and Virtual Processor Configuration

To be backward compatible with the MIPS32 and MIPS64 PRAs, a configurably multithreaded//multi-VPE processor must have a sane default thread/VPE configuration at reset. This would typically be, but need not necessarily be, that of a single VPE with a single thread context. The MVP bit of the Config3 register can be sampled at reset time to determine if dynamic VPE configuration is possible. If this capability is ignored, as by legacy software, the processor will behave as per specification for the default configuration.

If the MVP bit is set, the VPC (Virtual Processor Configuration) bit of the Config3 register can be set by software. This puts the processor into a configuration state in which the contents of the Config4 register can be read to determine the number of available VPE contexts, thread contexts, TLB entries, and coprocessors, and certain normally read-only "preset" fields of Config registers that become writable. Restrictions may be imposed on configuration state instruction streams, e.g. they may be forbidden to use cached or TLB-mapped memory addresses.

In the configuration state, the total number of configurable VPEs is encoded in the PVPE field of the Config4 register. Each VPE can be selected by writing its index into the CPUNum field of the EBase register. For the selected VPE, the following register fields can potentially be set by writing to them.

Config1.MMU Size
Config1.FP
Config1.MX
Config1.C2
Config3.NThreads
Config3.NITC_Pages
Config3.NITC_PLocs
Config3.MVP
VPESchedule Not all of the above configuration parameters need be configurable. For example, the number of ITC locations per page may be fixed, even if the ITC pages per VPE is configurable, or both parameters may be fixed, FPUs may be pre-allocated and hardwired per VPE, etc.

Coprocessors are allocated to VPEs as discrete units. The degree to which a coprocessor is multithreaded should be indicated and controlled via coprocessor-specific control and status registers.

A VPE is enabled for post-configuration execution by clearing the VPI inhibit bit in the EBase register.

The configuration state is exited by issuing an ECONF instruction. This instruction causes all uninhibited VPEs to take a reset exception and begin executing concurrently. If the MVP bit of the Config3 register is cleared during configuration and latched to zero by an ECONF instruction, the VPC bit can no longer be set, and the processor configuration is effectively frozen until the next processor reset. If MVP remains set, an operating system may re-enter the configuration mode by again setting the VPC bit. The consequences to a running VPE of the processor re-entering configuration mode may be unpredictable.

Quality of Service Scheduling for Multithreaded Processors

This specification up to the present point describes an application specific extension for a MIPS compatible system to accommodate multithreading. As previously stated, the MIPS implementation described is exemplary, and not limiting, as the functionality and mechanisms described may be applied in other than MIPS systems.

An issue visited in the background section, that of special service in multithreading for real-time and near real-time threads, has been briefly touched upon in the foregoing discussion directed to the ThreadSchedule register (FIG. 23) and VPESchedule register (FIG. 24). The balance of this specification deals with this issue in greater detail; teaching specific extensions for dealing specifically with thread-level quality of service ("QoS").

BACKGROUND

Networks designed for transporting multimedia data evolved a concept of Quality of Service ("QoS") to describe the need for different policies to be applied to different data streams in a network. Speech connections, for example, are relatively undemanding of bandwidth, but cannot tolerate delays beyond a few tens of milliseconds. QoS protocols in broadband multimedia networks ensure that time-critical transfers get whatever special handling and priority is necessary to ensure timely delivery.

One of the primary objections raised to combining "RISC" and "DSP" program execution on a single chip is that guaranteeing the strict real-time execution of the DSP code is far more difficult in a combined multi-tasking environment. The DSP applications can thus be thought of as having a "QoS" requirement for processor bandwidth.

Multithreading and QoS

There are a number of ways to schedule issuing of instructions from multiple threads. Interleaved schedulers will change threads every cycle, while blocking schedulers will change threads whenever a cache miss or other major stall occurs. The Multithreading ASE described in detail above, provides a framework for explicitly multithreaded processors that attempts to avoid any dependency on a specific thread scheduling mechanism or policy. However, scheduling policy may have a huge impact on what QoS guarantees are possible for the execution of the various threads.

A DSP-extended RISC becomes significantly more useful if QoS guarantees can be made about the real-time DSP code. Implementing multithreading on such a processor, such that the DSP code is running in a distinct thread, perhaps even a distinct virtual processor, and such that the hardware scheduling of the DSP thread can be programmably determined to provide assured QoS, logically removes a key barrier to acceptance of a DSP-enhanced RISC paradigm.

QoS Thread Scheduling Algorithms

Quality of Service thread scheduling can be loosely defined as a set of scheduling mechanisms and policies which allow a programmer or system architect to make confident, predictive statements about the execution time of a particular piece of code. These statements in general have the form "This code will execute in no more than Nmax and no less than Nmin cycles". In many cases, the only number of practical consequence is the Nmax number, but in some applications, running ahead of schedule is also problematic, so Nmin may also matter. The smaller the range between Nmin and Nmax, the more accurately the behavior of the overall system can be predicted.

Simple Priority Schemes

One simple model that has been proposed for providing some level of QoS to multithreaded issue scheduling is simply to assign maximal priority to a single designated real-time thread, such that if that thread is runnable, it will always be selected to issue instructions. This will provide the smallest value of Nmin, and might seem to provide the smallest possible value of Nmax for the designated thread, but there are some adverse consequences.

Firstly, only a single thread can have any QoS assurance in such a scheme. The algorithm implies that the Nmax for any code in a thread other than the designated real-time thread becomes effectively unbounded. Secondly, while the Nmin number for a code block within the designated thread is minimized, exceptions must be factored into the model. If the exceptions are taken by the designated thread, the Nmax value becomes more complex, and in some cases impossible to determine. If the exceptions are taken by threads other than the designated thread, Nmax is strictly bounded for code in the designated thread, but the interrupt response time of the processor becomes unbounded.

While such priority schemes may be useful in some cases, and may have some practical advantages in hardware implementation, they do not provide a general QoS scheduling solution.

Reservation-Based Schemes

An alternative, more powerful and unique thread-scheduling model is based on reserving issue slots. The hardware scheduling mechanisms in such a scheme allow one or more threads to be assigned N out of each M consecutive issue slots. Such a scheme does not provide as low an Nmin value as a priority scheme for a real-time code fragment in an interrupt-free environment, but it does have other virtues.

More than one thread may have assured QoS.

Interrupt latency can be bounded even if interrupts are bound to threads other than the one with highest priority. This can potentially allow a reduction in Nmax for real time code blocks.

One simple form of reservation scheduling assigns every Nth issue slot to a real-time thread. As there is no intermediate value of N between 1 and 2, this implies that real-time threads in a multithreading environment can get at most 50% of a processor's issue slots. As the real-time task may consume more than 50% of an embedded processor's bandwidth, a scheme which allows more flexible assignment of issue bandwidth is highly desirable.

Hybrid Thread Scheduling with QoS

The Multithreading system described above is deliberately scheduling-policy-neutral, but can be extended to allow for a hybrid scheduling model. In this model, real-time threads may be given fixed scheduling of some proportion of the thread issue slots, with the remaining slots assigned by the implementation-dependent default scheduling scheme.

Binding Threads to Issue Slots

In a processor instructions are issued sequentially at a rapid rate. In a multithreading environment one may quantify the bandwidth consumed by each thread in a mix by stating the proportional number of slots each thread issues in a given fixed number of slots. Conversely, the inventor recognizes that one may arbitrarily state a fixed number of slots, and predicate a means of constraining the processor to reserve a certain number of slots of the fixed number for a specific thread. One could then designate a fixed fraction of bandwidth guaranteed to a real-time thread.

Clearly one could assign slots proportionally to more than one real-time thread, and the granularity under which this scheme would operate is constrained by the fixed number of issue slots over which the proportions are made. For example, if one selects 32 slots, then any particular thread may be guaranteed from 1/32 to 32/32 of the bandwidth.

Perhaps the most general model, then, for assigning fixed issue bandwidth to threads is to associate each thread with a pair of integers, {N, D} which form the numerator and denominator of a fraction of issue slots assigned to the thread, e.g. ½, ⅘. If the range of integers allowed is sufficiently large, this would allow almost arbitrarily fine-grained tuning of thread priority assignments, but it has some substantial disadvantages. One problem is that the hardware logic to convert a large set of pairs, $\{\{N_0, D_0\}, \{N_1, D_1\}, \ldots \{N_n, D_n\}\}$ into an issue schedule is non-trivial, and error cases in which more than 100% of slots are assigned are not necessarily easy to detect. Another is that, while such a scheme allows specification that, over the long run, a thread will be assigned N/D of the issue slots, it does not necessarily allow any statements to be made as to which issue slots will be assigned to a thread over a shorter subset code fragment.

Therefore, in one embodiment of the present invention, instead of an integer pair, each thread for which real-time bandwidth QoS is desired is associated with a bit-vector which represents the scheduling slots to be allocated to that thread. In the embodiment, this vector is visible to system software as the contents of a ThreadSchedule Register (FIG. 23) described above. Although the ThreadSchedule Register contains a scheduling "mask" that is 32 bits wide, the number of bits in this mask may be greater or fewer in alternative embodiments. A thread scheduling mask that is 32 bits wide allows for a thread to be assigned from ½ to 32/32 of the processor issue bandwidth, and furthermore allows a specific issue pattern to be specified. Given a 32 bit mask a value of 0xaaaaaaaa assigns every second slot to the thread. A value of 0x0000ffff also assigns 50% of the issue bandwidth to the thread, but in blocks of 16 consecutive slots. Assigning a value of 0xeeeeeeee to thread X and a value of 0x01010101 to thread Y gives thread X 3 out of every 4 (24 out of 32) cycles, thread Y 1 out of every 8 (4 out of 32) cycles, and leaves the remaining 4 cycles per group of 32 to be assigned to other threads by other, possibly less deterministic hardware algorithms. Further, it can be known that thread X will have 3 cycles out of every 4, and that thread Y will never have a gap of more than 8 cycles between consecutive instructions.

Scheduling conflicts in this embodiment can be detected fairly simply, in that no bit should be set in the ThreadSchedule Register of more than one thread. That is, if a particular bit is set for one thread, that bit must be zero for all other threads to which issue masks are assigned. Conflicts are thus relatively easy to detect.

The issue logic for real-time threads is relatively straightforward: Each issue opportunity is associated with a modulo-32 index, which can be sent to all ready threads, at most one of which will be assigned the associated issue slot. If there is a hit on the slot, the associated thread issues its next instruction. If no thread owns the slot, the processor selects a runnable non-real-time thread.

ThreadSchedule Register implementations of less than 32-bits would reduce the size of the per-thread storage and logic, but would also reduce the scheduling flexibility. In principle, the register could also be enlarged to 64-bits, or even implemented (in the case of a MIPS Processor) as a series of registers at incrementing select values in the MIPS32 CP0 register space to provide much longer scheduling vectors.

Exempting Threads from Interrupt Service

As noted above, interrupt service can introduce considerable variability in the execution time of the thread which takes the exception. It is therefore desirable to exempt threads requiring strict QoS guarantees from interrupt service. This is accomplished in an embodiment with a single bit per thread, visible to the operating system, which causes any asynchronous exception raised to be deferred until a non-exempt thread is scheduled (i.e., bit IXMT of the ThreadStatus Register; see, FIGS. 18 and 19). This increases the interrupt latency, though to a degree that is boundable and controllable via the selection of ThreadSchedule Register values. If interrupt handler execution takes place only during issue slots not assigned to exempt real-time QoS threads, interrupt service has zero first-order effect on the execution time of such real-time code.

Issue Slot Allocation to Threads versus Virtual Processing Elements

The Multithreading ASE described in enabling detail above describes a hierarchical allocation of thread resources, wherein some number of Virtual Processing Elements (VPEs) each contain some number of threads. As each VPE has an implementation of CP0 and the privileged resource architecture (when configured on a MIPS Processor), it is not possible for the operating systems software ("OS") running on one VPE to have direct knowledge and control of which issue slots have been requested on another VPE. Therefore the issue slot name space of each VPE is relative to that VPE, which implies a hierarchy of issue slot allocation.

Figure 34:
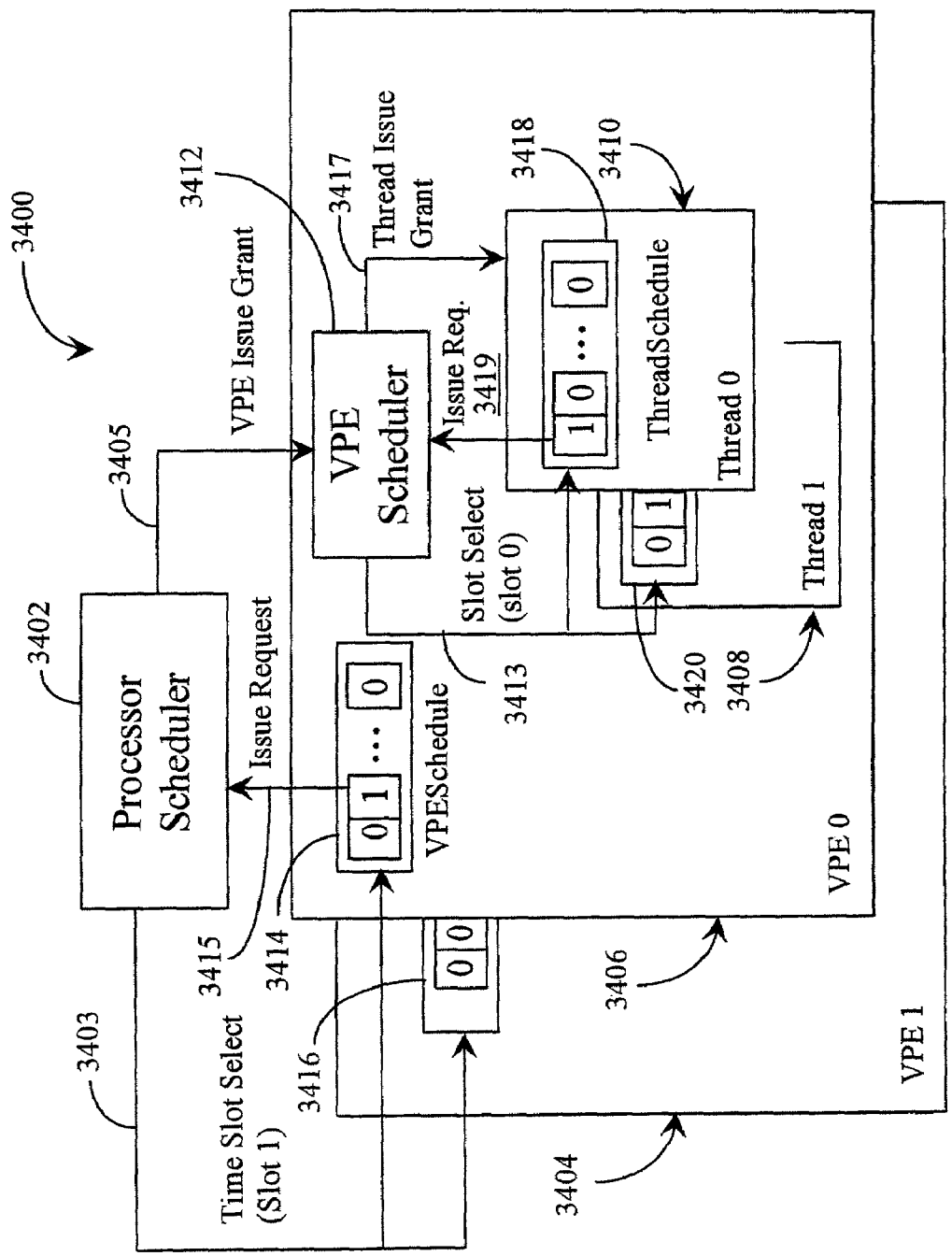
FIG. 34 is a diagram illustrating scheduling by VPE within a processor and by thread within a VPE in an embodiment of the present invention.

FIG. 34 is a block diagram of scheduling circuit 3400 illustrating this hierarchical allocation of thread resources. Processor Scheduler 3402 (i.e., the overall scheduling logic of the host processor) communicates an issue slot number via "Slot Select" signal 3403 to all VPESchedule registers disposed in all VPEs within the host processor. Signal 3403 corresponds to a bit position within the VPESchedule registers (which, in the present embodiment, would be one of thirty-two positions). Scheduler 3402 repeatedly circulates signal 3403 through such bit positions, incrementing the position at the occurrence of each issue slot and resetting to the least significant position (i.e., 0) after reaching the most significant bit position (i.e., 31 in the present embodiment).

Referring to FIG. 34, as an example, bit position 1 (i.e., "Slot 1") is being communicated via signal 3403 to all VPESchedule registers within the host processor; i.e., registers 3414 and 3416. Any VPESchedule register with the corresponding bit "set" (i.e., holding a logic 1) signals this fact to the processor scheduler with a "VPE Issue Request" signal. In response, the scheduler grants the subject VPE the current issue slot with a "VPE Issue Grant" signal. Referring again to FIG. 34, VPESchedule register 3414 (of VPE 0) has bit position 1 set and therefore sends VPE Issue Request signal 3415 to Processor Scheduler 3402 which responds with VPE Issue Grant signal 3405.

When a VPE is granted an issue, it employs similar logic at the VPE level. Referring again to FIG. 34, VPE Scheduler 3412 (i.e., the scheduling logic of VPE 0 3406) in response to signal 3405 presents an issue slot number via Slot Select signal 3413 to all ThreadSchedule registers disposed within the VPE. These ThreadSchedule registers are each associated with a thread supported by the subject VPE. Signal 3413 corresponds to a bit position within the ThreadSchedule registers (which, in the present embodiment, would be one of thirty-two positions). Scheduler 3412 repeatedly circulates signal 3413 through such bit positions, incrementing the position at the occurrence of each issue slot and resetting to the least significant bit position (i.e., 0) after reaching the most significant bit position (i.e., 31 in the present embodiment). This slot number is independent of the slot number used at the VPESchedule level.

Referring to FIG. 34, as an example, bit position 0 (i.e., "Slot 0") is being communicated on signal 3413 to all ThreadSchedule registers within the subject VPE; i.e., registers 3418 and 3420. Any thread with a bit set at the selected position of its ThreadSchedule register indicates that fact to the VPE scheduler, and that thread is granted the current issue slot. Referring to FIG. 34, ThreadSchedule register 3418 (of Thread 0) has bit position 0 set and therefore sends Thread Issue Request signal 3419 to VPE Scheduler 3412 which responds with Thread Issue Grant signal 3417 (thereby granting Thread 0 the current issue slot). On cycles where no VPESchedule bit is set for the slot indicated, or where no ThreadSchedule bit is set for the slot indicated, the processor or VPE scheduler will grant the next issue according to some other default scheduling algorithm.

In accordance with the foregoing, each VPE in one embodiment, for example VPE 0 (3406) and VPE 1 (3404) in FIG. 34, is assigned a VPESchedule Register (format shown in FIG. 24) which permits certain slots, modulo the length of the register's contents, to be deterministically assigned to that VPE. The VPESchedule registers in FIG. 34 are register 3414 for VPE 0 and register 3416 for VPE 1. Those issue slots which are not assigned to any VPE are assigned by implementation-specific allocation policies.

Also in accordance with the foregoing, the slots assigned to threads within a VPE are assigned from the allocation given to that VPE. For example, if a processor has two VPEs configured, as is shown in FIG. 34, such that one has a VPESchedule Register containing 0xaaaaaaaa and the other has a VPESchedule Register containing 0x55555555, the issue slots will be alternated between the two VPEs. If a thread on one of those VPEs has a ThreadSchedule Register containing 0x55555555, it will get every other issue slot of the VPE which contains it, which is to say every fourth issue slot of the overall processor.

Thus the value of the VPESchedule register associated with each VPE determines which processing slots go to each VPE. Specific threads are assigned to each VPE, such as Thread 0 and Thread 1 shown in VPE 0. Other threads not shown are similarly assigned to VPE 1. Associated with each thread there is a ThreadSchedule register, for example register 3418 for Thread 0 and register 3420 for Thread 1. The value of the ThreadSchedule registers determines the allocation of processing slots for each Thread assigned to a VPE.

Figure 33:
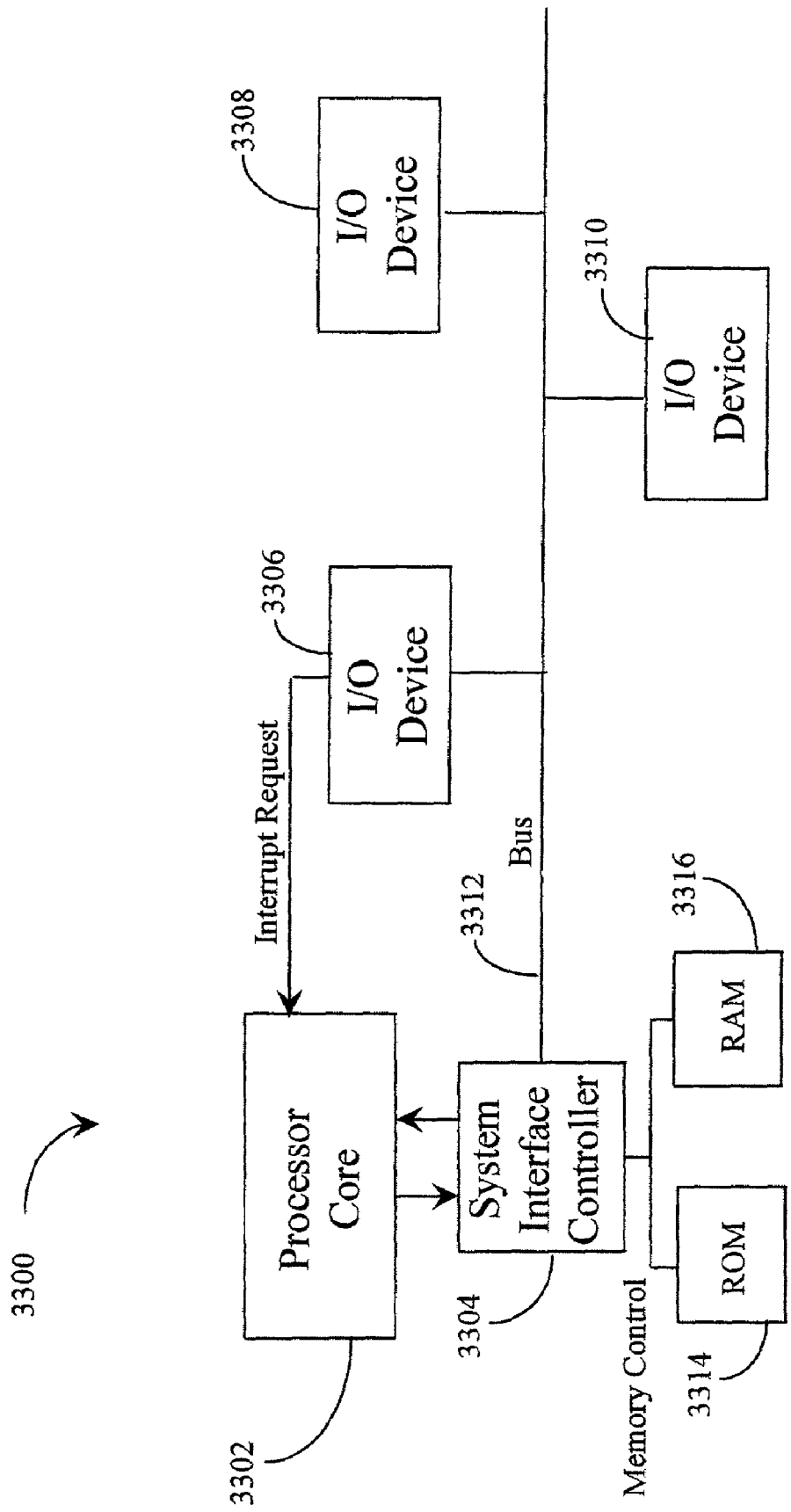
FIG. 33 is a diagram illustrating a computing system in an embodiment of the present invention.

Schedulers 3402 and 3412 may be constructed from simple combinational logic to carry out the functions set out above, and constructing these schedulers will be within the skill of the skilled artisan without undue experimentation, given the disclosure provided herein. They may, for example, be constructed in any conventional way, such as by combinational logic, programmable logic, software, and so forth, to carry out the functions described. FIG. 33 illustrates a computer system 3300 in a general form upon which various embodiments of the present invention may be practiced. The system includes a processor 3302 configured with the necessary decoding and execution logic (as would be apparent to one of ordinary skill in the art) to support one or more of the instructions described above and below (i.e., FORK, YIELD, MFTR, MTTR, EMT, DMT and ECONF). In one embodiment, core 3302 also includes scheduling circuit 3400 shown in FIG. 34 and represents the "host processor" as described above. System 3300 also includes a system interface controller 3304 in two-way communication with the processor, RAM 3316 and ROM 3314 accessible by the system interface controller, and three I/O devices 3306, 3308, and 3310 communicating with the system interface controller on a bus 3312. Through application of apparatus and code described in enabling detail herein, system 3300 may operate as a multithreaded system. It will be apparent to the skilled artisan that there may be many alterations to the general form shown in FIG. 33. For example, bus 3312 may take any one of several forms, and may be in some embodiments an on-chip bus. Similarly the number of I/O devices is exemplary, and may vary from system to system. Further, although only device 3306 is shown as issuing an interrupt request, it should be apparent that others of the devices may also issue interrupt requests.

Further Refinements

The embodiment described thus far for fixed 32-bit ThreadSchedule and VPESchedule registers does not allow for allocations of exact odd fractions of issue bandwidth. A programmer wishing to allocate exactly one third of all issue slots to a given thread would have to approximate to 10/32 or 11/32. A further programmable mask or length register in one embodiment allows the programmer to specify that a subset of the bits in the ThreadSchedule and/or VPESchedule Register(s) be used by the issue logic before restarting the sequence. In the example case, the programmer specifies that only 30 bits are valid, and programs the appropriate VPESchedule and/or ThreadSchedule Registers with 0x24924924.

YIELD—De-schedule and Conditionally Deallocate a Thread (Second Embodiment)

Figure 35:
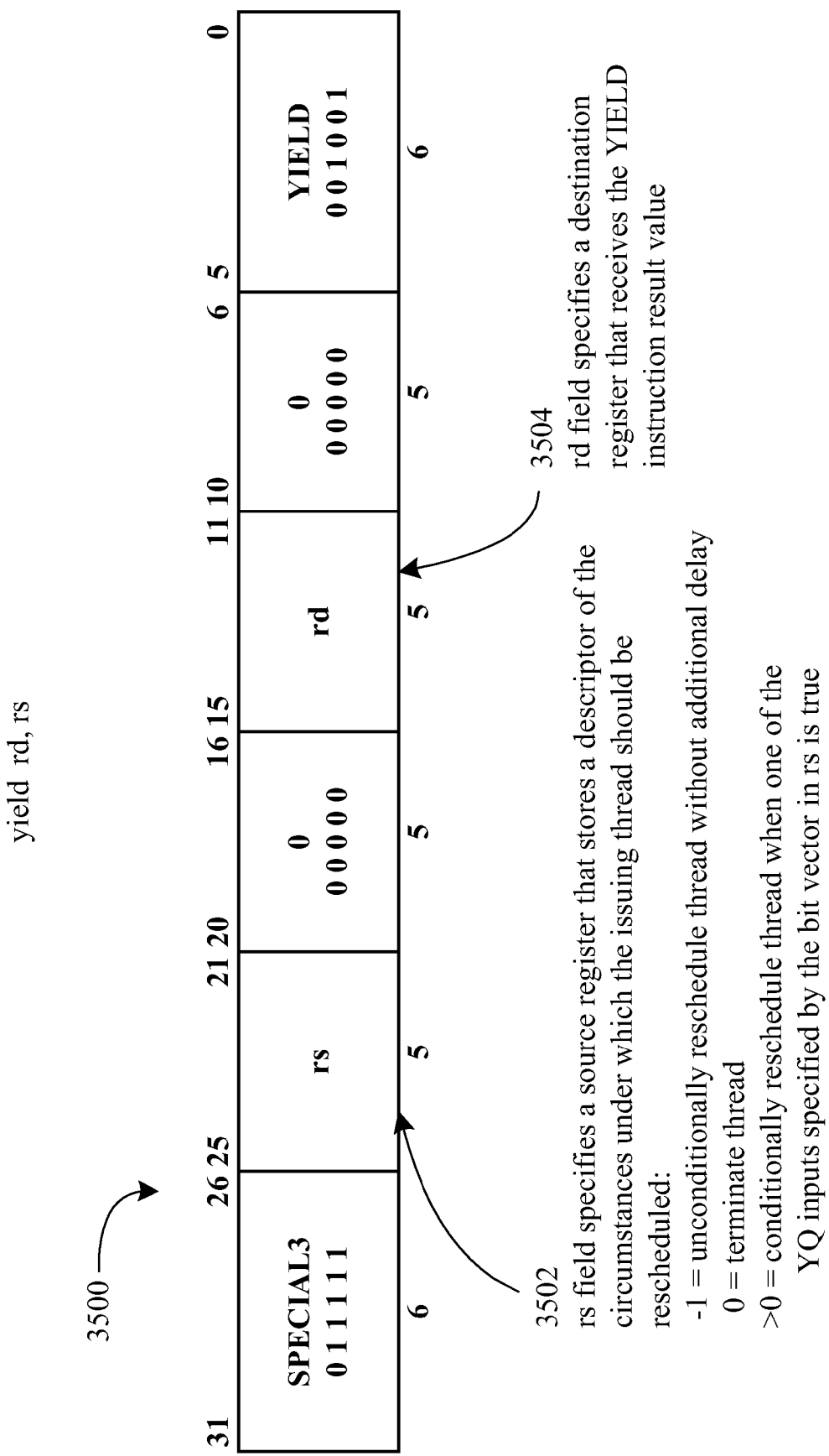
FIG. 35 is a block diagram illustrating the format of the YIELD instruction according to an alternate embodiment of the present invention.

Referring now to FIG. 35, a block diagram illustrating the format of the YIELD instruction 3500 according to an alternate embodiment of the present invention is shown. The YIELD instruction 3500 of FIG. 35 is similar to the instruction 600 of FIG. 6 as indicated; however, the YIELD instruction 3500 of FIG. 35 includes two differences. First, the meaning of the value stored in the register specified by the rs field 3502 is slightly different, as described below. Second, the YIELD instruction 3500 of FIG. 35 also includes a second operand field, rd 3504. In the embodiment of FIG. 35, the rd operand field 3504 comprises bits 11 through 15 of the YIELD instruction 3500. The rd operand field 3504 specifies a destination register, such as a GPR, which receives a result value at completion of the YIELD instruction 3500, as described below.

Figure 36:
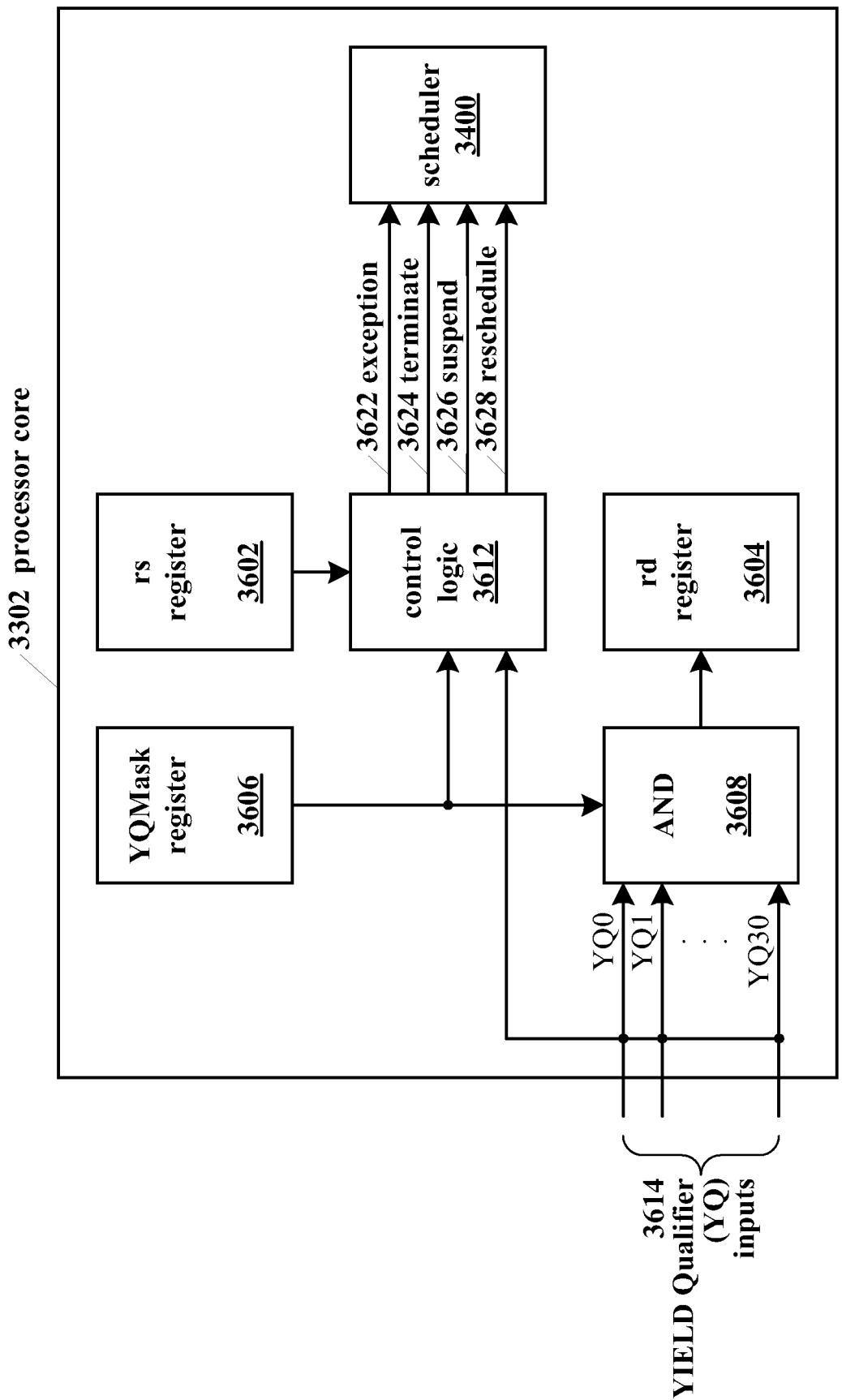
FIG. 36 is a block diagram of a processor core for executing the YIELD instruction of FIG. 35 according to the alternate embodiment of FIG. 35 of the present invention.

Referring now to FIG. 36, a block diagram of a processor core 3302 for executing the YIELD instruction 3500 of FIG. 35 according to the alternate embodiment of FIG. 35 of the present invention is shown. The processor core 3302 of FIG. 36 is similar to the processor core 3302 of the system 3300 of FIG. 33. The processor core 3302 includes a scheduler 3400 of FIG. 34. The processor core 3302 also includes an rs register 3602 specified by the rs field 3502 of FIG. 35, an rd register 3604 specified by the rd field 3504 of FIG. 35, a YQMask Register 3606, a block of thirty-one two-input AND gates 3608, and control logic 3612.

The processor core 3302 receives thirty-one YIELD Qualifier (YQ) inputs 3614, denoted YQ0 through YQ30. The YQ inputs 3614 may receive signals generated by circuits external to the processor core 3302, including but not limited to interrupt signals generated by I/O devices, such as I/O devices 3306 of FIG. 33. The YQ inputs 3614 may also receive signals generated internally by the processor core 3302, including but not limited to software interrupt signals and cache miss signals. Furthermore, the YQ inputs 3614 may receive a combination of signals generated externally and internally to the processor core 3302. In one embodiment, a signal source may be coupled to both a YQ input 3614 and an interrupt input to the processor core 3302. In one embodiment, one or more of the YQ inputs 3614 may not be connected to a signal source, but instead may be connected to a logical one or zero value as appropriate.

Figure 37:
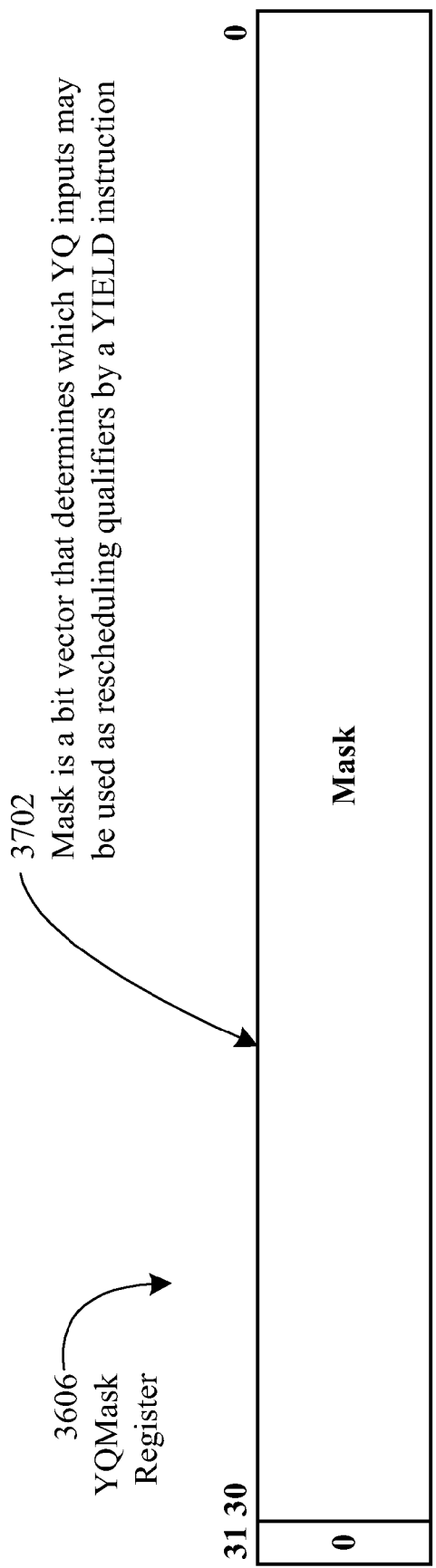
FIG. 37 is a block diagram illustrating the format of the YQMask Register of FIG. 36.

Referring briefly to FIG. 37, a block diagram illustrating the format of the YQMask Register 3606 of FIG. 36 is shown. The YQMask Register 3606 is a thirty-two bit register. Bit 31 is zero. Bits 0 through 30 comprise a Mask field 3702. The Mask field 3702 is a bit vector programmable by software, such as the operating system, that specifies which of the YQ inputs 3614 may be used as a condition for rescheduling the thread issuing the YIELD instruction 3500. In particular, if a YIELD instruction 3500 specifies a YQ input 3614 that is not specified in the YQMask Register 3606, the processor core 3302 raises an exception, as described below. In one embodiment, the YQMask register 3606 is defined per VPE.

Referring again to FIG. 36, each of the AND gates 3608 receives on one of its inputs a corresponding YQ input 3614. Each of the AND gates 3608 receives on its other input a corresponding bit of the thirty-one bit vector stored in the YQMask register 3606. The thirty-one output bits of the AND gates 3608 are provided as a bit vector for storage in rd register 3604 at the completion of the YIELD instruction 3500. The rd register 3604 result value is architecturally defined to have the same bit organization and positions as the YQ inputs 3614, as shown in FIG. 37.

The rs register 3602 stores a descriptor of the circumstances under which the thread issuing the YIELD instruction 3500 should be rescheduled, as described herein. In particular, the rs register 3602, if it contains a positive value, specifies a bit vector of YQ inputs 3614. When one of the YQ inputs 3614 specified in the rs 3602 bit vector is true, the processor core 3302 reschedules the thread.

The control logic 3612 receives the YQ inputs 3614, the contents of the YQMask register 3606, and the contents of the rs register 3602. The control logic 3612 may include, but is not limited to, combinatorial and sequential logic, programmable logic, software, and the like, configured to perform the functions described herein. The control logic 3612 generates an exception signal 3622, a terminate thread signal 3624, a suspend thread signal 3626, and a reschedule thread signal 3628, all of which are provided to scheduler 3400. In one embodiment, the control logic 3612 and the scheduler 3400 are integrated.

The exception signal 3622 indicates the YIELD instruction 3500 has caused an exception. In one embodiment, a YIELD instruction 3500 causes an exception if the rs register 3602 bit vector value specifies a YQ input 3614 whose corresponding bit in the YQMask register 3606 is clear. In one embodiment, a YIELD instruction 3500 causes an exception if the YIELD instruction 3500 specifies the thread is to be terminated (i.e., via a zero rs register 3602 value), however the thread issuing the YIELD instruction 3500 is not a dynamically allocatable thread, i.e., the thread is a wired thread. In one embodiment, a YIELD instruction 3500 causes an exception if the YIELD instruction 3500 specifies the thread is to be terminated (i.e., via a zero rs register 3602 value), however no other thread is available for scheduling.

The terminate signal 3624 indicates the thread issuing the YIELD instruction 3500 should be terminated, or deallocated. The processor core 3302 terminates, or deallocates, a thread by stopping fetching and issuing instructions from the thread. In addition, the processor core 3302 frees the hardware state, or resources, i.e., thread context, previously allocated for execution of the thread making the freed hardware state available for allocation by another thread. In one embodiment, the hardware resources may include but are not limited to a program counter register, a set of general purpose registers, multiplier result registers, and/or one or more privileged system coprocessor resources, including but not limited to portions of the registers shown in FIG. 15.

The suspend signal 3626 indicates the thread issuing the YIELD instruction 3500 is to be suspended, or blocked. The processor core 3302 suspends, or blocks, a thread by stopping fetching and issuing instructions from the thread.

The reschedule signal 3628 indicates the thread issuing the YIELD instruction 3500 is to be rescheduled. The processor core 3302 reschedules a thread by designating the thread eligible for execution subject to the thread scheduling policy. That is, the processor core 3302 adds the thread to the list of threads that are currently ready for execution such that the processor core 3302 will begin fetching and issuing instructions from the thread's program counter if the scheduler 3400 so specifies.

Figure 38:
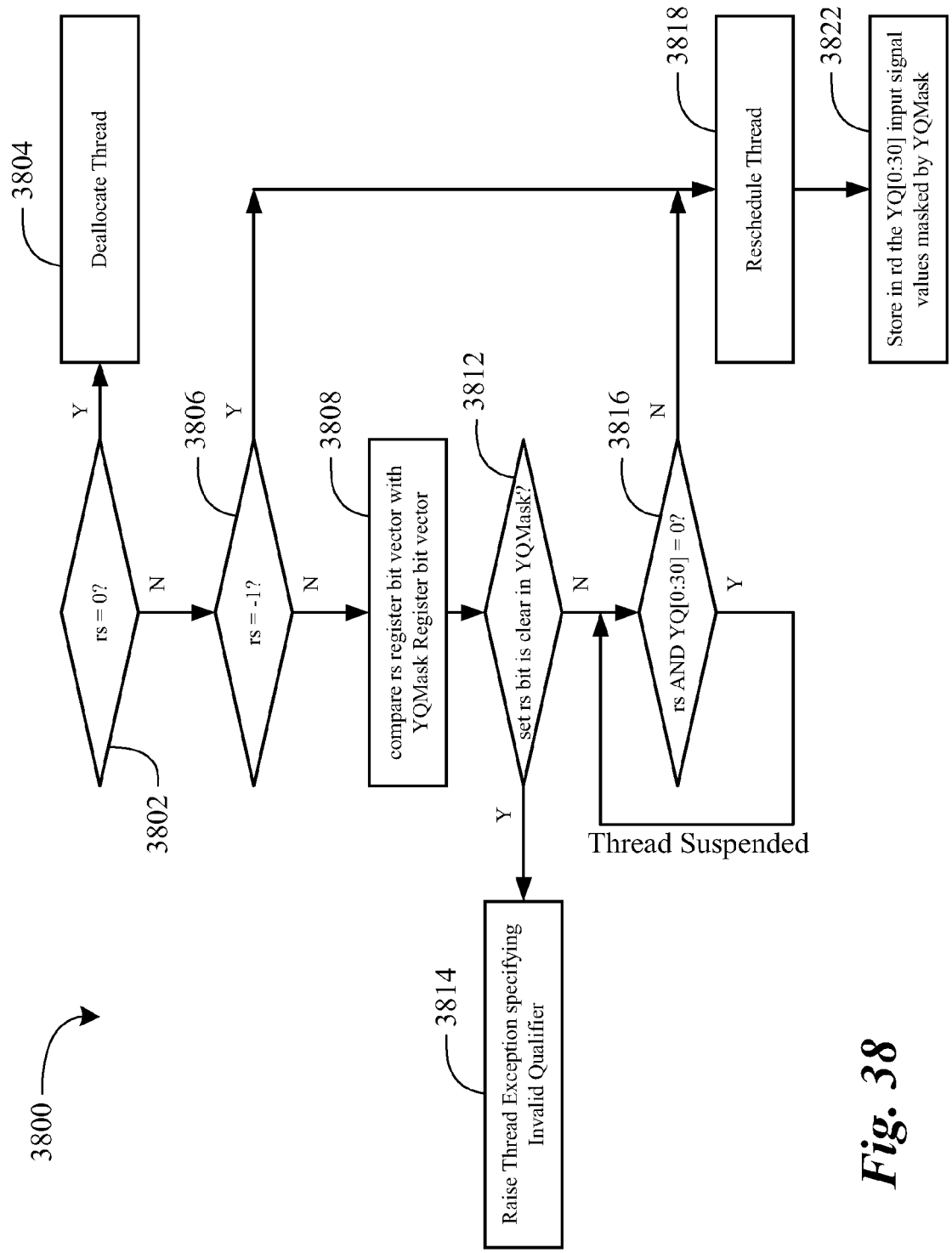
FIG. 38 is a flowchart illustrating operation of the processor core of FIG. 36 to execute a YIELD instruction of FIG. 35 according to the alternate embodiment of FIG. 35 of the present invention.

Referring now to FIG. 38, a flowchart illustrating operation of the processor core 3302 of FIG. 36 to execute a YIELD instruction 3500 of the alternate embodiment of FIG. 35 according to the present invention is shown. Flow begins at decision block 3802.

At decision block 3802, the control logic 3612 of FIG. 36 examines the rs register 3602 to determine if its value is zero. If so, flow proceeds to block 3804; otherwise, flow proceeds to decision block 3806.

At block 3804, control logic 3612 generates a true value on terminate signal 3624 of FIG. 36 to cause the thread to be terminated. That is, the thread is not rescheduled, and the thread's context is de-allocated and freed for allocation by a subsequent FORK instruction 300. In one embodiment, if the YIELD instruction 3500 causes the thread to be terminated and no other thread is available for scheduling, the processor core 3302 raises an exception. In one embodiment, if the processor core 3302 terminates the thread, no value is returned in the rd register 3604. Flow ends at block 3804.

At decision block 3806, the control logic 3612 examines the rs register 3602 to determine if its value is negative one (−1). If so, flow proceeds to block 3818; otherwise, flow proceeds to block 3808.

At block 3808, the control logic 3612 compares the bit vector stored in rs register 3602 with the bit vector stored in the YQMask Register 3606. In one embodiment, negative values of rs register 3602 other than −1 are reserved; hence, at block 3808 it is known that the value stored in rs register 3602 is a positive value. Flow proceeds to decision block 3812.

At decision block 3812, the control logic 3612 determines whether any of bits 0 through 30 that are set in the rs register 3602 have a corresponding bit clear in the YQMask Register 3606. If so, flow proceeds to block 3814; otherwise, flow proceeds to decision block 3816.

At block 3814, the control logic 3612 generates a true value on the exception signal 3622 to indicate that the thread specified an invalid YQ input 3614. Flow ends at block 3814.

At decision block 3816, control logic 3612 examines the YQ inputs 3614 to determine whether all of the YQ inputs 3614 specified by a set bit on rs register 3602 are false. If so, flow returns to decision block 3816 and the control logic 3612 continues to generate a true value on the suspend signal 3626 to cause the thread to remain suspended until one of the YQ inputs 3614 specified by a set bit in rs register 3602 becomes true. Otherwise, flow proceeds to block 3818.

At block 3818, the control logic 3612 generates a true value on reschedule signal 3628 of FIG. 36 to cause scheduler 3400 to reschedule the thread. That is, the thread is eligible for scheduling at the next opportunity, but invokes the scheduler 3400 and relinquishes the processor core 3302 for other threads which ought to execute first according to the scheduler 3400 scheduling policy. Flow proceeds to block 3822.

At block 3822, processor core 3302 stores into the rd register 3604 the YQ input 3614 signal values masked by the YQMask Register 3606 value, i.e., the output of the AND gates of FIG. 36. In one embodiment, the YQ input 3614 signal values are sampled at the time the YIELD instruction 3500 is retired by the processor core 3302. Flow ends at block 3822.

In one embodiment, the processor core 3302 does not issue the instruction in the thread including the YIELD instruction 3500 until the scheduler 3400 has begun executing the thread after rescheduling the thread at block 3818.

Although FIGS. 35-40 describe an embodiment in which the input operand to the YIELD instruction 3500 is provided in a general purpose register, namely rs register 3602, in other embodiments the input operand may be provided via other means, such as via a memory or via a non-general purpose register. For example, although embodiments have been described in which the processor 3302 is a register-based processor, other embodiments are contemplated in which the processor is a stack-based processor, such as a processor configured to efficiently execute Java virtual machine code. In such embodiments, the input operand of the YIELD instruction 3500 may be specified in an operand stack in memory rather than in a register. For example, each thread context may include a stack pointer register, and a field of the YIELD instruction 3500 may specify an offset of the YIELD input operand into the stack memory relative to the stack pointer register value, rather than specifying a register in the processor's register space. Similarly, the YIELD instruction 3500 return value may be returned on an operand stack rather than in a register.

As may be observed from the foregoing, the YIELD instruction 3500 of the present invention advantageously provides a means for conditional termination of the thread based on the value of the rs 3602 input operand. In a parallel, or multithreaded, computation, the termination condition of a thread of execution may be computed at run-time. For example, a loop may test for a set of conditions to be met, and in response selectively terminate the loop based on the test. The present YIELD instruction 3500 allows for the thread to perform a computation that produces either a zero or negative one value in the rs register 3602, and then the thread executes a YIELD instruction 3500 on the rs register 3602 value to either terminate (on zero) or continue (on negative one) and branch back to the top of the loop. Although a similar effect could be achieved with additional compare and branch instructions, the present conditional value-based YIELD instruction 3500 enables multithreaded code to be more compact and to execute more efficiently in the microprocessor 100 pipeline.

As may be observed from the foregoing, by programming the YQMask Register 3606 and using the rd register 3604 return value in a particular manner, a program may perform two potentially useful simulations of the operation of a blocking YIELD instruction 3500.

First, an operating system can simulate the operation of a YIELD instruction 3500 that blocks on a particular YQ input 3614 even though the hardware source of the signal to be connected to the YQ input 3614 is not present, without modifying the application program. This simulation may be useful for testing application programs while the hardware signal source is being developed or during prototype development. The operating system may program the YQMask Register 3606 to clear the bits corresponding to the absent YQ input 3614 so that a YIELD rd, rs 3500 with the corresponding bit set in rs register 3602 causes an exception. In response to the exception, the operating system suspends the thread until it is appropriate to simulate that the "virtual" YQ input 3614 is true. At that time, the operating system decodes the rd field 3504 of the YIELD instruction 3500 to determine which register was selected as the rd register 3604, writes an appropriate value into the rd register 3604, advances the thread's program counter to the instruction immediately following the YIELD instruction 3500, and restarts execution of the thread. To the application program, it appears as if the YIELD instruction 3500 blocked, waited, and was rescheduled in response to a true value on the specified YQ input 3614. In addition, the operating system may employ the YQMask Register 3606 to insure program operation when migrating threads from one processor core 3302 to another, such as to perform load-balancing among multiple processor cores 3302.

Second, an application program could explicitly simulate in software the operation that the processor core 3302 performs in hardware by blocking execution of a YIELD instruction 3500 until a set of YQ inputs 3614 specified by the rs register 3602 is true. The software simulation is similar to a program polling for an interrupt rather than allowing the hardware to transfer execution to an interrupt service routine in response to an interrupt request. In the normal case, i.e., the non-simulation case, assume the YQMask Register 3606 has one or more bits set and a YIELD rd, rs 3500 is executed where the corresponding bits in the rs register 3602 are set. The processor core 3302 will suspend the thread issuing the YIELD instruction 3500 until one of the specified YQ inputs 3614 is true. To simulate this operation, a program stores a bit vector in the YQMask Register 3606 specifying the set of YQ inputs 3614 in question. The program issues a YIELD rd, rs 3500 where the value of rs register 3602 is −1 causing the thread to be rescheduled without blocking. When the YIELD instruction 3500 completes, the return value in the rd register 3604 will contain the YQ input 3614 signal values specified in the YQMask Register 3606. The application program then tests the return value, and if it is zero, loops back to the YIELD instruction 3500 until the return value is non-zero. Thus, a YIELD instruction 3500 specifying an rs register 3602 value of −1 becomes a means of polling, or sampling, the YQ inputs 3614 that would otherwise be used by the processor core 3302 hardware to block execution of the thread issuing the YIELD instruction 3500. It is noted that execution of the program thread is still controlled based upon the actual YQ inputs 3614 specified; however, the hardware blocking of the thread is simulated by the program itself rather than the processor core 3302.

Figure 39:
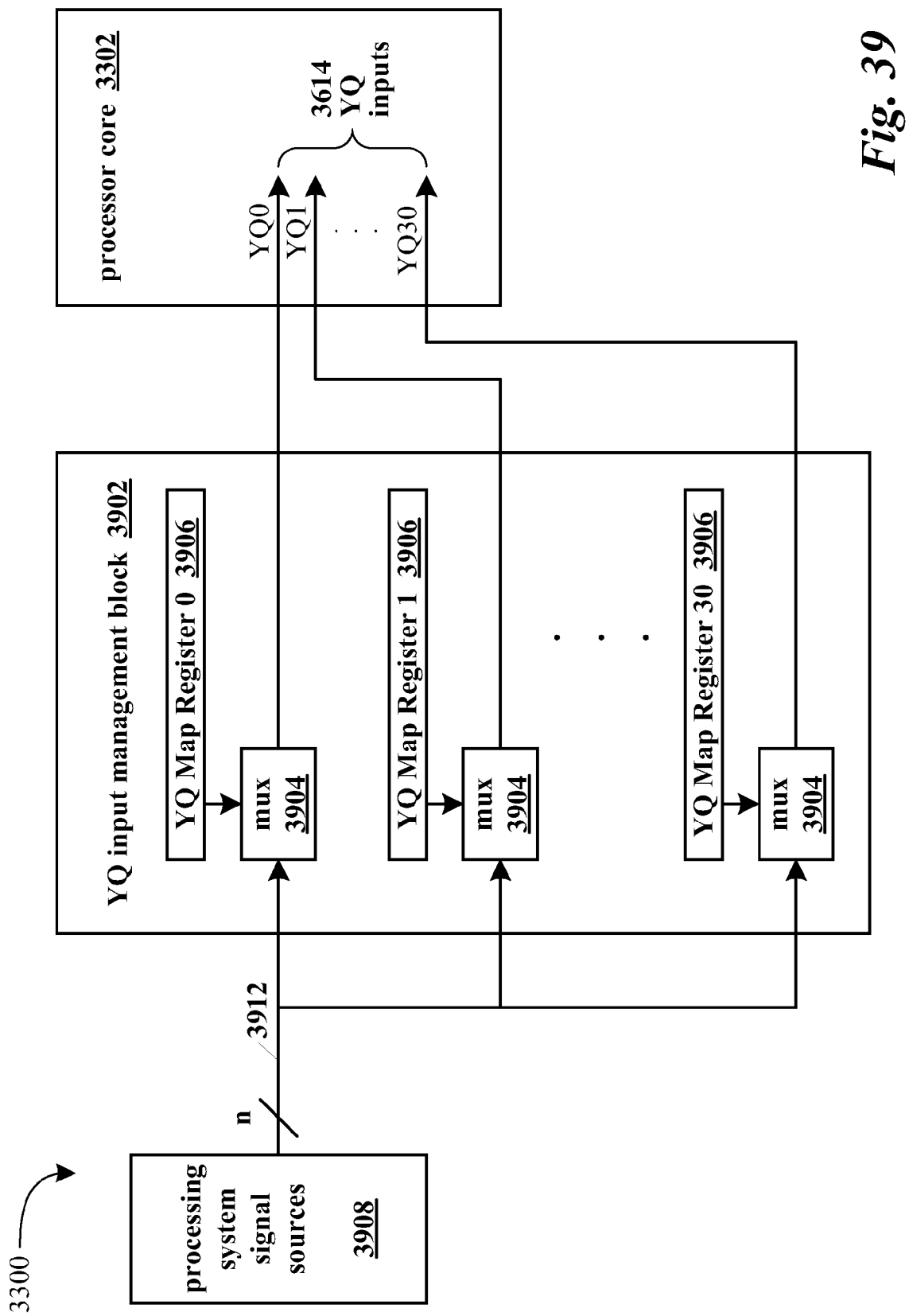
FIG. 39 is a block diagram illustrating a processing system, such as the processing system of FIG. 33, including the processor core of FIG. 36 for executing a YIELD instruction according to the alternate embodiment of FIG. 35 of the present invention.

Referring now to FIG. 39, a block diagram illustrating a processing system 3300, such as the processing system 3300 of FIG. 33, including the processor core 3302 of FIG. 36 for executing a YIELD instruction 3500 according to the alternate embodiment of FIG. 35 of the present invention is shown. The system 3300 includes signal sources 3908 that generate signals 3912, such as but not limited to, the interrupt request signals generated by the I/O devices 3306 of FIG. 33.

The system 3300 also includes a YQ input management block 3902. The YQ input management block 3902 includes thirty-one YQ Map Registers 3906 controlling corresponding muxes 3904. The embodiment of FIG. 39 illustrates three YQ Map Registers 3906, denoted YQ Map Register 0 3906, YQ Map Register 1 3906, and YQ Map Register 30 3906, whose corresponding mux 3904 outputs are coupled to YQ input 0 3614, YQ input 1 3614, and YQ input 30 3614, respectively. Each of the muxes 3904 receives all of the signals 3912 from the signal sources 3908 and selects one of the signals 3912 for provision to its respective YQ input 3614 based on a select input provided by its respective YQ Map Register 3906. In one embodiment, the YQ Map Registers 3906 are programmable by a program executing on the processor core 3302. In one embodiment, the YQ input management block 3902 is included in the processor core 3302 rather than being external to the processor core 3302. In another embodiment, the YQ input management block 3902 is comprised in a coprocessor to the processor core 3302.

Referring now to FIG. 40, a block diagram illustrating a semantic of the rs register 3602 specified in the rs field 3502 of the YIELD instruction 3500 of FIG. 35 according to an alternate embodiment of the alternate embodiment of FIG. 35 according to the present invention is shown. The embodiment of FIG. 40 is employed in a processor core 3302 which receives only four YQ inputs 3614 of FIG. 36 rather than thirty-one. The four YQ inputs 3614 are selected based on values programmed into a YQ input management block 3902 similar to that of FIG. 39. In one embodiment, the YQ input management block 3902 is comprised in a coprocessor to the processor core 3302. In one embodiment, each thread context includes a YQ input management block 3902.

The rs register 3602 is divided into eight 4-bit fields. Four of the fields are inversion mask fields, denoted INV3, INV2, INV1, and INV0. Four of the fields are AND-enabling term fields, denoted AND3, AND2, AND1, and AND0. The table shown in FIG. 40 describes each of the fields.

The control logic 3612 includes circuitry to perform the following manipulation of the YQ inputs 3614 based on the rs register 3602 value. The four YQ input 3614 values, whose mapping to signals 3912 is controlled by the YQ input management block 3902, are brought into four independent sets of XOR gates, where the bits set in the corresponding INVx field are inverted to create a conditioned set of active-high values. Each of the four conditioned qualifiers is provided to an independent n-Way AND block, where the set of bits selected by the associated ANDx field is ANDed together with an implicit 1 (i.e. if only one ANDx bit is set, the output tracks the corresponding input) to produce one of four gated qualifiers. The four gated qualifiers are then ORed together. If the result is non-zero, the control logic 3612 generates a true value on reschedule signal 3628 to reschedule the thread.

In one embodiment, the return value stored into the rd register 3604 is a vector of the four gated qualifier values. In one embodiment, the return value is stored in the least significant bits of the rd register 3604. In another embodiment, the return value is shifted left by two bits to create an address offset to facilitate a software switch based on the reason for rescheduling.

As in the embodiment of FIG. 35, a zero rs register 3602 value causes the thread to be terminated. However, to accomplish the unconditional rescheduling of the thread specified in FIG. 35 by a −1, the rs register 3602 is programmed with a value using the INV and AND masks to create (A)|(~A) for any "A" out of the 4 YQ inputs 3614.

Although embodiments have been described in which thirty-one YQ inputs 3614 are provided and a thirty-two bit architecture has been described, the YIELD instruction 3500 described herein is not limited to these embodiments, but may be extended or contracted to various numbers in inputs and register sizes.

The Multithreading ASE described in this application may, of course, be embodied in hardware; e.g., within or coupled to a Central Processing Unit ("CPU"), microprocessor, microcontroller, digital signal processor, processor core, System on Chip ("SOC"), or any other programmable device. Additionally, the Multithreading ASE may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

A Multithreading ASE embodied in software may be included in a semiconductor intellectual property core, such as a processor core (e.g., embodied in HDL) and transformed to hardware in the production of integrated circuits. Additionally, a Multithreading ASE as described herein may be embodied as a combination of hardware and software.

It will be apparent to those with skill in the art that there may be a variety of changes made in the embodiments described herein without departing from the spirit and scope of the invention. For example, the embodiments described have been described using MIPS processors, architecture and technology as specific examples. The invention in various embodiments is more broadly applicable, and not limited specifically to such examples. Further, a skilled artisan might find ways to program the functionality described above in subtle different ways, which should also be within the scope of the invention. In the teachings relative to QoS the contents of the ThreadSchedule and VPESchedule Registers are not limited in length, and many changes may be made within the spirit and scope of the invention.

Therefore, the invention is limited only by the breadth of the claims that follow.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A microprocessor core, comprising:
    a plurality of inputs, configured to indicate whether a corresponding plurality of independently occurring events has occurred, wherein said plurality of inputs are non-memory address inputs; and
    a yield instruction, included in an instruction set of an architecture of the microprocessor core, comprising an output operand and an input operand, said input operand for specifying one or more of said plurality of independently occurring events;
    wherein said yield instruction instructs the microprocessor core to suspend issuing for execution instructions of a thread until at least one of said independently occurring events specified by said input operand has occurred, wherein said thread contains said yield instruction;
    wherein said yield instruction further instructs the microprocessor core to return a first value in said output operand indicating which of said independently occurring events occurred to cause the microprocessor core to resume issuing said instructions of said thread.

2. The microprocessor core of claim 1, wherein said yield instruction further instructs the microprocessor core to resume issuing an instruction of said thread immediately following said yield instruction, rather than executing an event handling routine to handle said at least one of said independently occurring events.

3. The microprocessor core of claim 1, wherein when said input operand is a predetermined value, said yield instruction instructs the microprocessor core to terminate said thread, rather than to suspend issuing said instructions of said thread.

4. The microprocessor core of claim 1, wherein when said input operand is a predetermined value, said yield instruction instructs the microprocessor core to unconditionally resume issuing said instructions of said thread, rather than to suspend issuing said instructions of said thread.

5. The microprocessor core of claim 1, wherein said at least one of said independently occurring events is generated by an input/output device.

6. The microprocessor core of claim 1, wherein at least one of said plurality of inputs is configured to receive an interrupt request signal.

7. The microprocessor core of claim 1, wherein at least one of said plurality of inputs is configured to receive a signal indicating a cache miss.

8. The microprocessor core of claim 1, further comprising:
    a mask register, programmable by system software for storing a second value specifying one or more of said plurality of inputs, wherein the microprocessor core raises an exception to said yield instruction when said second value specifies one or more of said plurality of inputs unspecified by said second value.

9. The microprocessor core of claim 8, wherein said yield instruction further instructs the microprocessor core to return said second value qualified by said second value.

10. The microprocessor core of claim 8, further comprising:
    a plurality of thread contexts, configured to store a state of a plurality of program threads concurrently executed by the microprocessor core, each of said plurality of thread contexts comprising a program counter and a general purpose register set;
    wherein said mask register is global to said plurality of thread contexts.

11. The microprocessor core of claim 1, further comprising:
a plurality of thread contexts, configured to store a state of a plurality of program threads concurrently executed by the microprocessor core, each of said plurality of thread contexts comprising a program counter and a general purpose register set;
wherein said plurality of inputs are non-specific to said plurality of thread contexts, thereby facilitating migration of said plurality of program threads among said plurality of thread contexts by an operating system.

12. The microprocessor core of claim 1, wherein said input operand specifies a Boolean function performed by the microprocessor core on said plurality of inputs, wherein said yield instruction instructs the microprocessor core to suspend issuing for execution said instructions of said thread until an output of said Boolean function indicates said at least one of said independently occurring events specified by said input operand has occurred.

13. The microprocessor core of claim 1, wherein said plurality of inputs are mapped from a plurality of signal sources according to a plurality of programmable registers coupled to said plurality of inputs.

14. A method for conditionally suspending issuing instructions of a thread in a microprocessor core having an instruction set of an architecture of the microprocessor core, the method comprising:
receiving a plurality of inputs configured to indicate whether a plurality of independently occurring events has occurred, wherein said plurality of inputs are non-memory address inputs;
issuing a yield instruction, said yield instruction included in the instruction set of the architecture of the microprocessor core, said yield instruction comprising an output operand and an input operand, said input operand for specifying one or more of said plurality of independently occurring events;
suspending issuing for execution instructions of said thread until at least one of said independently occurring events specified by said input operand has occurred, wherein said thread contains said yield instruction; and
returning a first value in said output operand indicating which of said independently occurring events occurred to cause the microprocessor core to resume issuing said instructions of said thread.

15. The method of claim 14, wherein said returning comprises:
returning said value in said output operand indicating which of said plurality of independently occurring events occurred to cause the microprocessor core to resume issuing an instruction of said thread immediately following said yield instruction, rather than executing an event handling routine to handle said at least one of said independently occurring events.

16. The method of claim 14, further comprising:
unconditionally resuming issuing said instructions of said thread, rather than said suspending issuing for execution said instructions of said thread, when said input operand is a predetermined value.

17. The method of claim 14, further comprising:
terminating said thread, rather than said suspending issuing for execution said instructions of said thread, when said input operand is a predetermined value.

18. The method of claim 14, wherein at least one of said plurality of inputs is configured to receive an interrupt request signal.

19. The method of claim 14, wherein at least one of said plurality of inputs is configured to receive a signal indicating a cache miss.

20. The method of claim 14, further comprising:
programming a mask register of the microprocessor to store a second value specifying one or more of said plurality of inputs, wherein said programming is performed by system software executing on the microprocessor;
raising an exception to said yield instruction when said second value specifies one or more of said plurality of inputs unspecified by said second value.

21. A computer program product for use with a computing device, the computer program product comprising:
a computer-readable storage medium, having computer readable program code embodied in said medium, for providing a microprocessor core, said computer readable program code comprising:
first program code for providing a plurality of inputs, configured to indicate whether a plurality of independently occurring events has occurred, wherein said plurality of inputs are non-memory address inputs; and
second program code for providing a yield instruction, included in an instruction set of an architecture of the microprocessor core, comprising an output operand and an input operand, said input operand for specifying one or more of said plurality of independently occurring events;
wherein said yield instruction instructs the microprocessor core to suspend issuing for execution instructions of a thread until at least one of said independently occurring events specified by said input operand has occurred, wherein said thread contains said yield instruction;
wherein said yield instruction further instructs the microprocessor core to return a value in said output operand indicating which of said independently occurring events occurred to cause the microprocessor core to resume issuing said instructions of said thread.

22. The computer program product of claim 21, wherein said yield instruction further instructs the microprocessor core to resume issuing an instruction of said thread immediately following said yield instruction, rather than executing an event handling routine to handle said at least one of said independently occurring events.

23. The computer program product of claim 21, wherein when said input operand is a predetermined value, said yield instruction instructs the microprocessor core to unconditionally resume issuing said instructions of said thread, rather than to suspend issuing said instructions of said thread.

24. The computer program product of claim 21, wherein when said input operand is a predetermined value, said yield instruction instructs the microprocessor core to terminate said thread, rather than to suspend issuing said instructions of said thread.

25. The computer program product of claim 21, further comprising:
third program code for providing a plurality of thread contexts, configured to store a state of a plurality of program threads concurrently executed by the microprocessor core, each of said plurality of thread contexts comprising a program counter and a general purpose register set;
wherein said plurality of inputs are non-specific to said plurality of thread contexts, thereby facilitating migration of said plurality of program threads among said plurality of thread contexts by an operating system.

* * * * *